US011259533B2

(12) United States Patent
Bessemans et al.

(10) Patent No.: US 11,259,533 B2
(45) Date of Patent: Mar. 1, 2022

(54) AUTOMATICAL IN SITU CONTROL OF THE CONFINED ENVIRONMENT OF METABOLICALLY ACTIVE PRODUCE

(71) Applicants: KATHOLIEKE UNIVERSITEIT LEUVEN, Leuven (BE); VLAAMS CENTRUM VOOR BEWARING VAN TUINBOUWPRODUCTEN VZW, Leuven (BE)

(72) Inventors: Niels Bessemans, Sint-Truiden (BE); Bart Nicolai, Heusden-Zolder (BE); Pieter Verboven, Herent (BE); Bert Verlinden, Aarschot (BE)

(73) Assignee: OPTIFLUX NV, Leuven (BE)

( * ) Notice: Subject to any disclaimer, the term of this patent is extended or adjusted under 35 U.S.C. 154(b) by 601 days.

(21) Appl. No.: 16/302,852

(22) PCT Filed: May 18, 2017

(86) PCT No.: PCT/EP2017/062040
§ 371 (c)(1),
(2) Date: Nov. 19, 2018

(87) PCT Pub. No.: WO2017/198793
PCT Pub. Date: Nov. 23, 2017

(65) Prior Publication Data
US 2019/0216105 A1      Jul. 18, 2019

(30) Foreign Application Priority Data

May 18, 2016   (GB) .................................. 1608735.5

(51) Int. Cl.
*A23B 7/14*       (2006.01)
*G05D 16/02*   (2006.01)
(Continued)

(52) U.S. Cl.
CPC .............. *A23B 7/148* (2013.01); *A23B 7/144* (2013.01); *G05D 16/028* (2019.01); *G05D 21/00* (2013.01)

(58) Field of Classification Search
CPC ...... G05D 16/028; G05D 21/00; A23B 7/144; A23B 7/148
See application file for complete search history.

(56) References Cited

U.S. PATENT DOCUMENTS

| 5,333,394 A | 8/1994 | Herdeman et al. |
| 6,092,430 A | 7/2000 | Liston et al. |
| (Continued) | | |

FOREIGN PATENT DOCUMENTS

| EP | 0457431 A2 | 11/1991 |
| EP | 0798962 B1 | 5/2003 |
| (Continued) | | |

OTHER PUBLICATIONS

Baker et al., "A Method for Estimating Carbon Dioxide Leakage Rates in Controlled-Environment Chambers Using Nitrous Oxide," Environmental and Experimental Botany, vol. 51, 2004, pp. 103-110.

(Continued)

*Primary Examiner* — Paul J Gray
(74) *Attorney, Agent, or Firm* — Workman Nydegger

(57) ABSTRACT

A control system for controlling the storage of metabolically active produce in a defined confined environment. The control system comprises gas analyzing and pressure measurement means including a control unit for determining an adjusted gas medium composition of the confined environment for protecting the produce against metabolic degradation. An operating/actuating means for adapting the gas medium in the confined storage environment is based on the determined adjusted gas medium composition. The control (Continued)

unit is adapted for determining the adjusted gas medium composition based on a mathematical model of the system that determines a metabolic coefficient of the produce by combining measured changes of gas composition in the confined environment with dynamic pressure changes in the confined space. The value of the metabolic coefficient is used as input for a control algorithm to continuously adjust the gas composition in the confined space in response to the metabolic activity of the produce.

20 Claims, 7 Drawing Sheets

(51) Int. Cl.
    *A23B 7/148* (2006.01)
    *A23B 7/144* (2006.01)
    *G05D 16/00* (2006.01)
    *G05D 21/00* (2006.01)

(56) References Cited

U.S. PATENT DOCUMENTS

| | | |
|---|---|---|
| 6,615,908 B1 | 9/2003 | Bosher et al. |
| 7,208,187 B2 | 4/2007 | Gäbler |
| 2007/0144638 A1 | 6/2007 | Fernandez et al. |
| 2012/0097050 A1 | 4/2012 | Schaefer et al. |
| 2013/0013099 A1* | 1/2013 | Delele .......... A23B 7/148 700/214 |
| 2015/0017296 A1 | 1/2015 | Veltman |
| 2015/0257401 A1 | 9/2015 | Brackmann |
| 2019/0248567 A1* | 8/2019 | Savur .......... B65D 81/2069 |

FOREIGN PATENT DOCUMENTS

| | | |
|---|---|---|
| EP | 2092831 A1 | 8/2009 |
| EP | 2816890 A1 | 12/2014 |
| EP | 2547213 B1 | 6/2015 |
| WO | 0206795 A2 | 1/2002 |
| WO | 2014066952 A1 | 5/2014 |

OTHER PUBLICATIONS

Bartsch, "CA Room Testing," 2004 Cornell Fruit Handling and Storage Newsletter, 2004, pp. 16-20.

Beaudry, "Effect of O2 and CO2 Partial Pressure on Selected Phenomena Affecting Fruit and Vegetable Quality," Postharvest Biology and Technology, vol. 15, 1999, pp. 293-303.

Both et al., "Effects of Dynamic Controlled Atmosphere by Respiratory Quotient on Some Quality Parameters and Volatile Profile of 'Royal Gala' Apple After Long-Term Storage," Food Chemistry, vol. 215, 2017, pp. 483-492.

Delong et al., "Chlorphyll Fluorescence-Based Low-O2 CA Storage of Organic 'Cortland' and 'Delicious' Apples," Acta Horticulturae, vol. 737, 2007, pp. 31-37.

Gasser et al., "Control of the Critical Oxygen Level During Dynamic CA Storage of Apples by Monitoring Respiration as Well as Chlorophyll Fluorescence," Acta Horticulturae, vol. 796, 2008, pp. 69-76.

Hoehn et al., "Storage Technology and Applications," Modified and Controlled Atmospheres for the Storage, Transportation, and Packaging of Horticultural Commodities, Mar. 11, 2009, pp. 18-50.

Peppelenbos et al., "A Theoretical Approach on the Role of Fermentation in Harvested Plant Products," Acta Horticulturae, vol. 464, 1998, pp. 381-386.

Raghavan et al., "Refrigerated and Controlled/Modified Atmosphere Storage," Processing Fruits 2nd Edition, 2005, 30 Pages.

Saltveit, "Is it Possible to Find an Optimal Controlled Atmosphere?," Postharvest Biology and Technology, vol. 27, 2003, pp. 3-13.

Veltman et al., "Dynamic Control System (DCS) for Apples (Malus Domestica Borkh. cv 'Elstar'): Optimal Quality Through Storage Based on Product Response," Postharvest Biology and Technology, vol. 27, 2003, pp. 79-86.

Weber et al., "Respiratory Quotient: Innovative Method for Monitoring 'Royal Gala' Apple Storage in a Dynamic Controlled Atmosphere," Scientia Agricola, vol. 72, No. 1, Jan./Feb. 2015, pp. 28-33.

Yearsley et al., "Determination of Lower Oxygen Limits for Apple Fruit," Postharvest Biology and Technology, vol. 8, 1996, pp. 95-109.

Zanella et al., "Dynamic Controlled Atmosphere (DCA) Storage by the Means of Chlorophyll Fluorescence Response for Firmness Retention in Apple," Acta Horticulturae, vol. 796, 2008, pp. 77-82.

Great Britain Search Report from GB Application No. GB 1608735.5, dated Nov. 18, 2016.

International Preliminary Report on Patentability from PCT Application No. PCT/EP2017/062040, dated May 29, 2018.

International Search Report from PCT Application No. PCT/EP2017/062040, dated Sep. 22, 2017.

Bessemans et al., "A Novel Type of Dynamic Controlled Atmosphere Storage Based on the Respiratory Quotient (RQ-DCA)," Postharvest Biology and Technology, vol. 115, May 2016, pp. 91-102.

Office Action from corresponding EP Application No. 17728080.7, dated Dec. 19, 2019.

\* cited by examiner

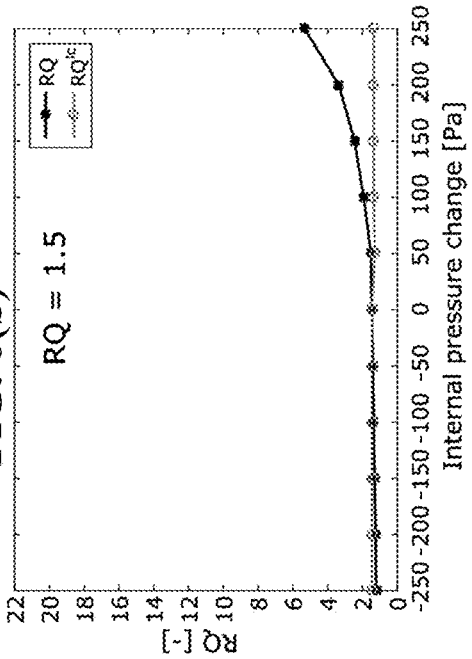
FIG. 6(a) RQ = 1.0
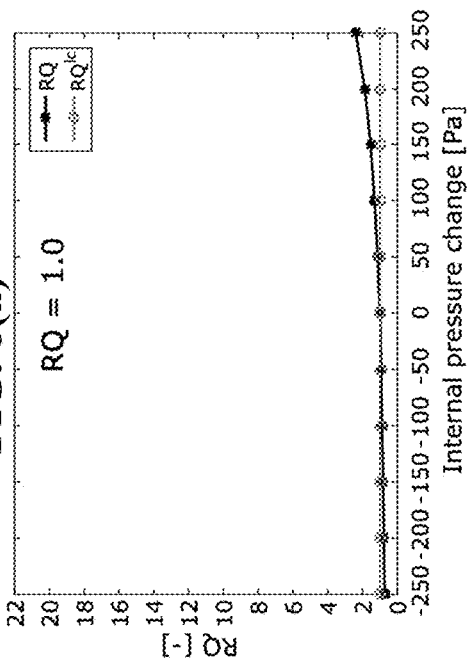
FIG. 6(b) RQ = 1.5
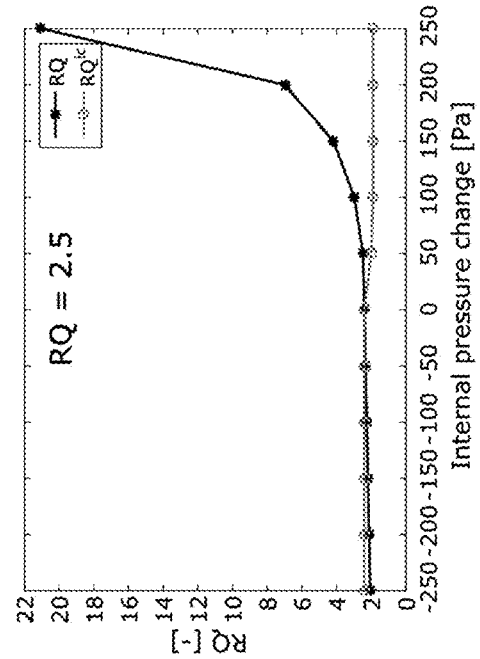
FIG. 6(c) RQ = 2.0
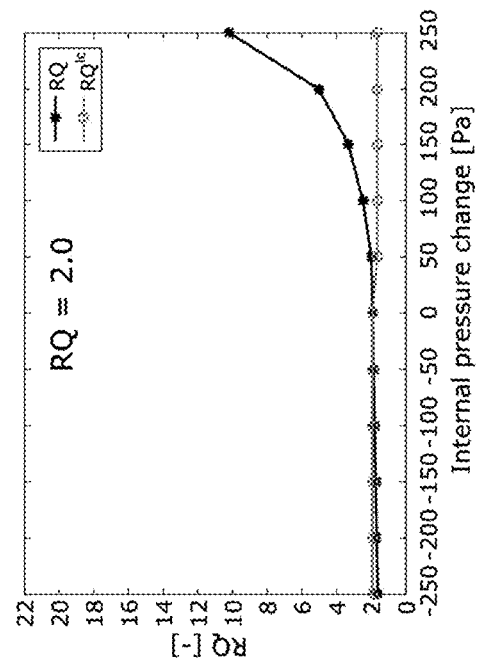
FIG. 6(d) RQ = 2.5

AUTOMATICAL IN SITU CONTROL OF THE CONFINED ENVIRONMENT OF METABOLICALLY ACTIVE PRODUCE

BACKGROUND OF THE INVENTION

A. Field of the Invention

This invention concerns a dynamic method and system relates to the algorithmic control of gas composition in the atmosphere of confined controlled environments, for instance storage or growth environments, of respiratory produce, such as fruits, vegetables and plants, and, more particularly to a method and apparatus to dynamically control the gas composition in the controlled environment through a software-assisted monitoring of the rates of gas composition changes in a system where the produce can be maintained over prolonged periods of time. Such system comprises a mathematical model that determines the actual gas exchange rates of the produce as a measure of their metabolic activity, such as respiration and fermentation.

Several documents are cited throughout the text of this specification. Each of the documents herein (including any manufacturer's specifications, instructions etc.) are hereby incorporated by reference; however, there is no admission that any document cited is indeed prior art of the present invention.

B. Description of the Related Art

Respiratory produce (fruit, vegetables and plants) are commonly stored at a low temperature (typically close to 0° C.) in combination with a reduced $O_2$ and increased $CO_2$ partial pressure (so-called "Controlled Atmosphere (CA) storage") to reduce their respiration rate, and, hence, extend their storage life.

Metabolically active plants or crops are plants undergoing active physiological processes of photosynthesis and/or respiration. Such metabolically active plants can be grown in a confined environment such as a plant factory with artificial lighting and very limited exchange of ambient external environmental air under a so called Controlled Atmosphere (CA) growth to optimize the basic process of photosynthesis and respiration underlying metabolic pathway that produces chemical energy (i.e., adenosine triphosphate (ATP) and redox equivalents) to meet cell energy demands for growth and maintenance of such metabolically active plants.

However, the optimal gas composition is critical, as too low an $O_2$ partial pressure in combination with too high a $CO_2$ partial pressure induces a fermentative metabolism in the fruit (Beaudry, Postharvest Biol Technol, 15: 293-303, 1999). This causes off-flavours (e.g., ethanol) and storage disorders (e.g., browning and core breakdown). For this reason, the $O_2$ and $CO_2$ partial pressure in commercial cool stores is kept at a safe and steady value. Such systems have been developed under U.S. Pat. No. 5,333,394, "Controlled atmosphere container system for perishable products", U.S. Pat. No. 6,092,430, "Oxygen/carbon dioxide sensor and controller for a refrigerated controlled atmosphere shipping container" and U.S. Pat. No. 6,615,908, "Method of transporting or storing perishable product". These patents dealt with atmosphere control, use of membranes and use of sensors. Patent US070144638 was positioned as an improvement over these systems, being more economical (energy efficient) and not resulting in increased pressure in the containers (due to the regulation of the gases of the then current methods. European Patent EP0457431 describes a system for controlling oxygen and carbon dioxide concentrations in a refrigerated container for respiring perishables to dynamically and continuously control the gas concentrations. European Patent application EP2092831 describes a similar system. All these methods aim at predetermined values of gas concentrations. U.S. Pat. No. 5,333,394 describes a CA container with controller that will implement bursts of gas supply which are preprogrammed based upon a particular application; it does not use measured gas production and consumption rates.

Further, U.S. Pat. No. 7,208,187 discloses a control method of a controlled atmosphere where at least one trace gas in a concentration of less than 1% is measured at least at two different times, and where the control variables are determined on the rate of change in the concentration of the trace gas, which is then used as a measure of the production rate of the trace gas. The referred gasses are ethylene, ethanol, ethane, acetaldehyde and carbon dioxide. The method does not consider gasses that are consumed due to respiration, i.e. oxygen. The method does also not consider the proportion of the rate of change of two gasses as a measure of physiological state.

Conventionally, controlled atmosphere (CA) storage of respiratory produce thus uses static, fixed set-points that are recommended as optimal storage conditions. As the concentrations are set at safe levels, significant firmness loss may still occur. In addition, the development of postharvest disorders, even under optimal CA, has been reported (Peppelenbos & Oosterhaven, Acta Hort 464: 381-386, 1998; DeLong et al., Acta Hort 737: 31-37, 2007). Due to the high biological variability of horticultural products the recommended optimal storage conditions may be different from the real optimal storage condition (Saltveit, Postharvest Biol Technol 27: 3-13, 2003; Veltman et al., Postharvest Biol Technol 27: 79-86, 2003).

Adaptive CA (ACA) storage systems can adapt the atmospheric gas composition based on the actual physiological state of the fruit (Veltman et al., Postharvest Biol Technol 27: 79-86, 2003; Zanella et al., Acta Hort 796, 77-82, 2008) as a function of fruit batch and time, such that variations due to factors such as geographical location, cultivar, mutant, orchard effects, harvest date and storage duration, can be taken into account. ACA storage can maintain fruit quality to a greater extent than conventional CA and Ultra low oxygen (ULO) storage facilities (Gasser et al., Acta Hort 796 69-76: 2008; Zanella et al., Acta Hort 796, 77-82, 2008), and has been proposed as a viable option for organic apple producers who are not using preventive chemicals (DeLong et al., Acta Hort 737: 31-37, 2007). Veltman et al. Postharvest Biol Technol 27: 79-86 (2003) showed that ACA resulted in quality improvement of 'Elstar' apples, with better firmness retention and inhibition of the 'skin spots' defect. Other applications of ACA have been successful for storage of apple cultivars 'Granny Smith' and 'Delicious' (Hoehn et al., In (M. M. Yahia): Modified and Controlled Atmospheres for the Storage, Transportation, and Packaging of Horticultural Commodities, CRC Press, 42, 2009).

Monitoring systems for ACA have been developed based on chlorophyll fluorescence (Prange et al., patent No WO0206795) and monitoring the release of acetaldehyde or ethanol (Veltman et al. Postharvest Biol Technol 27: 79-86 (2003)).

The principle behind ACA storage is storage of fruit in an atmosphere with the lowest possible oxygen level that is tolerated by the fruit. Below this level fermentation becomes important and physiological disorders such as internal browning may develop. In practice, a fruit response signal which is generated under such conditions is used for monitoring oxygen stress. Two systems are already in use. Systems using chlorophyll fluorescence as the fruit response signal have been disclosed in patent WO-0206795. Controlled Atmosphere (CA) using chlorophyll fluorescence requires several expensive sensors per cool room, and has methodological constraints such as measurement position (a constant distance of the sensor to apples is required). Veltman et al. Postharvest Biol Technol 27: 79-86 (2003) used fermentative ethanol production as the fruit response signal. Ethanol measurements are conducted off-line in sampled fruits from the storage room or from the room air. The ethanol based system is disclosed in patents WO-0206795 and EP-0798962. The former method is a procedure that does not match the characteristics of a dynamic commodity indicator as part of an automated control system. The latter is unreliable due to possible interaction of the detection equipment with gasses such as ethylene, which may be present in the sample air (Hoehn et al., In (M. M. Yahia): Modified and Controlled Atmospheres for the Storage, Transportation, and Packaging of Horticultural Commodities, CRC Press, 42, 2009).

Both methods have been benchmarked against respiration measurements. The onset of stressful conditions indicated by increased ethanol concentration or chlorophyll fluorescence signal concurs with the lowest acceptable respiration rate, which can be obtained by measuring the changes of $O_2$ oxygen and/or $CO_2$ concentration in the atmosphere around the fruit (Veltman et al. Postharvest Biol Technol 27: 79-86, 2003; Gasser et al., Acta Hort 796: 69-76, 2008). Measurement of respiration rate in storage rooms has not been found practical (Hoehn et al., In (M. M. Yahia): Modified and Controlled Atmospheres for the Storage, Transportation, and Packaging of Horticultural Commodities, CRC Press, 42, 2009).

Yearsly et al., Postharvest Biol Technol 8: 95-109 (1996) and Gasser et al., Acta Hort 796: 69-76 (2008) demonstrated on small batches of apples in jars that the respiration coefficient RQ (rate of $CO_2$ production per rate of consumption of $O_2$) increases drastically below the lowest respiration rate, due to the onset of fermentation. This demonstrated that RQ concurs with chlorophyll fluorescence and ethanol methods.

Jar experiments in the laboratory however exclude important influencing factors of actual storage rooms (size and shape of the room, leakages, climate conditions, stacking pattern, storage of gasses inside the fruits) that prevent exact determination of RQ, and therefore make accurate control in real systems impossible. In particular, jars provide an airtight system that excludes leakages and can be controlled to prevent temperature and pressure fluctuations. In containers, chambers or rooms, accurately determining gas leakage rates is essential for correcting measurements of physiological processes such as respiration and fermentation (Hoehn et al., In (M. M. Yahia): Modified and Controlled Atmospheres for the Storage, Transportation, and Packaging of Horticultural Commodities, CRC Press, 42, 2009). Existing methods use non-reacting tracer gasses for this purpose in separate tests (Baker et al., Environ Exp Bot 51: 103-110, 2004) or pressure decay in empty rooms at ambient temperature (Bartsch, Cornell Fruit Handling and Storage Newsletter, 16-20, 2004; Raghaven et al., In (D. M. Barett, L. Somogy, H. Ramaswamy): Processing Fruits, CRC Press, 23-52, 2005). Leakage is dependent on room design and construction, climate conditions, load, and changes with time. Yearly tests are recommended (Hoehn et al., In (M. M. Yahia): Modified and Controlled Atmospheres for the Storage, Transportation, and Packaging of Horticultural Commodities, CRC Press, 42, 2009). In heavily used storage rooms, a method for automatic measurement of leakage is required to reduce workload, automate storage room management and implement Dynamic controlled atmosphere (DCA). In fact, in the current invention DCA will be implemented in such a way that the effect of leakage can be automatically corrected for without additional systems or tests, such as those claimed in EP2816890 A1. To achieve this, the storage room needs to be maintained at an overpressure relative to its direct environment, which is achieved by injection of $N_2$ gas which is expensive. Furthermore, the storage room must comply with certain requirements regarding leak tightness to be able to achieve this overpressure. Also with the system described in EP2816890 A1, respiration of the produce is only determined periodically.

In heavily used storage rooms, a method for automatic measurement of RQ is required to reduce workload, automate storage room management and thus implement Dynamic CA rather than Adjusted CA. Rather than RQ-based control, a new control paradigm is also needed that uses the total gas exchange rate quotient (GERQ) in the storage environment and determines by means of a mathematical model of the system the actual respiratory rate of the product.

In patent EP2547213B1 we demonstrated that dynamic control of CA storage environments does not only requires dynamic and accurate measurement of $O_2$ and $CO_2$ levels as a function of time in the room, but also the rate of gas exchanges with the external environment and accumulation of the gasses. In the referred patent, a method is presented that estimates a characteristic leakage coefficient of the room enclosure to correct for leakage. While the determination of and correcting for such coefficient was demonstrated feasible and advantageous, it required additional and separate measurement protocols.

The present invention does not require sealing the space of from external influences such as leakage during detection of respiration which is the basis and constraint of the method claimed in application EP2816890 A1.

WO2014/066952 A1 describes a system to control the gas composition in a storage container for fruit. The change in internal pressure is measured to calculate an equivalent leak hole diameter that is compared to a reference leak hole diameter. Based on this, the control system determines the rate of ambient air inflow to maintain a fixed gas composition in the storage container. Drawbacks of the system are that leakage parameters such as equivalent leak hole diameter have to be calculated, only leakage of gas from the direct environment of the storage container to the storage container is considered and not vise versa and that the produce is stored at a fixed gas composition and not automatically at the optimal gas composition. Furthermore, the control algorithm is not based on and adapted to a metabolic parameter of the produce.

With the present invention, no leakage parameters such as equivalent leak hole diameter or leakage constant have to be determined. The control system uses a measurement of the internal pressure to determine a metabolic coefficient of the metabolic produce, taking into account leakage from the confined space to its environment and vice versa and stores the produce automatically at the optimal gas composition.

This invention embodies a system and associated instrumentation for automatic monitoring a metabolic coefficient such as RQ that takes into account factors of room design and operation based on internal pressure measurements rather than measuring leakage coefficients. The present invention clearly demonstrates that the evaluation of the gas exchange dynamics of the complete storage system (including the fruit, the storage atmosphere, the room design and the gas leakage to or from the outside) taking into account climate conditions provides a means to accurately monitor the respiration activity of the produce. The present invention allows also to automatically calculate the future gas composition required to maintain the respiration of the produce at safe levels. The system can advise storage room operators to adapt the gas composition, or applies an automated control of gas composition in the storage environment.

SUMMARY OF THE INVENTION

The present invention solves the problems of the related art of accurate control of a respiratory produce in a confined environment by calculating a metabolic coefficient as a function of the measured gas composition in the confined environment and as a function of the pressure in the in the confined environment, which metabolic coefficient is determined by the control unit at least as a function of the gas composition and the pressure out of at least two consecutive times over a selective time period in the confined environment, 2) as a function of the calculated metabolic coefficient to determine an adjusted gas medium composition. and 3) to generate an output signal that drives the operator/actuator to control the respiratory produce. This method has several advantages over the art. It is more accurate than a method whereby on has to estimate an equivalent leak hole diameter. One does not have to introduce air from the outside via a diagram (gas in let) for pressure measurement or to draw $CO_2$ through a semi-permeable membrane. By the method of present invention one also avoids the requirement to estimate a leakage parameter (k). This is an improvement, since the value of k may vary in time so that several estimation are needed separated in time as the k is function of the load of the confined space, temperature and pressure or pressure difference between the confined space and the environment. Another advantage of the system of present invention is that for detecting the respiration of the produce in the confined environment one does not have to turn of the atmosphere control (CA control) and temperature control during measurement and to seal the leakage substantially tight during measurement and/or to keep the atmosphere in motion and/or to adjust pressure by $N_2$ so that one only can do this in determined time intervals (>1 h). Mostly in this classic system several days are between measurement.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description. It is to be understood that both the foregoing general description and the following detailed description are exemplary and explanatory only and are not restrictive of the invention, as claimed.

FIG. 1 provides a schematic view of the control system based on a software assisted measurement system of gas composition and atmospheric pressure in a confined environment and control algorithm. The metabolically active produce (a) is contained in a confined environment (b). The pressure is measured with a pressure sensor (c) and the gas composition with a gas analyzer (d). The signals of the pressure sensor and gas analyzer are used by the control unit (e) to calculate a metabolic coefficient of the produce (a) that calculates an output signal in function of the value of the metabolic coefficient. The control unit output signal drives the operator/actuator (f) to adjust the gas composition in the confined environment using a gasses supplied from a conventional gas treatment unit (g) that can comprise scrubbers and generators.

The invention provides a way to solve the problems of the related art of accurate control of a respiratory produce in a confined environment by, first, calculating a metabolic coefficient as a function of the measured gas composition in the confined environment and as a function of the pressure in the confined environment, which metabolic coefficient is determined by the control unit at least as a function of the gas composition and the pressure out of at least two consecutive times over a selective time period in the confined environment, second, as a function of the calculated metabolic coefficient to determine an adjusted gas medium composition, and, third, to generate an output signal that drives the operator/actuator to control the respiratory produce. This method has several advantages over the art. It is more accurate than a method whereby on has to estimate an equivalent leak hole diameter. By using an inventive system it is possible to protect respiratory produce from a metabolic disorder or against fermentative degradation.

With respect to protecting the respiratory produce or controlling its metabolism, it is noted that it is advantageous if these means of the control system are capable to carry out this without needing to introduce air from the outside via a diagram (gas inlet) for pressure measurement or without needing to draw $CO_2$ through a semi-permeable membrane.

A further advantageous aspect by the method or system of present invention is also that one also does not have to estimate a leakage parameter (k). This is an improvement, since the value of k may vary in time so that several estimations are needed separated in time as the k is function of the load of the confined space, temperature and pressure or pressure difference between the confined space and the environment. Another advantage of the system of present invention is that for detecting the respiration of the produce in the confined environment one does not have to turn of temperature control during measurement and to seal the leakage substantially tight during measurement and/or to keep the atmosphere in motion and/or to adjust pressure by $N_2$ so that one only can do this in determined time intervals (>1 h). Mostly in this classic system several days are between measurement.

The object of the present invention is to provide a method or system for controlling the metabolism of a produce and in particular to protect it against a metabolic disorder or against fermentative degradation, that is less complex, time consuming and more accurate.

According to the present invention there is provided a control system for controlling of respiratory produce in a confined environment, said control system comprising an operator/actuator, a gas analyser and an atmospheric pressure sensor, and a control unit adapted to receive the signals of the gas analyser and of the atmospheric pressure sensor and adapted to generate an output signal responsive to a change of gas composition and pressure in the confined environment, which output signal drives the operator/actuator to adjust the gas composition in the confined environment, characterized in that the control unit is designed 1) to calculate a metabolic coefficient as a function of the measured gas composition in the confined environment and as a function of the pressure in the in the confined environment, which metabolic coefficient is determined by the control unit at least as a function of the gas composition and the pressure out of at least two consecutive times over a selective time period in the confined environment, 2) as a function of the calculated metabolic coefficient to determine an adjusted gas medium composition, and 3) to generate an output signal that drives the operator/actuator to control the respiratory produce. In this system the gas analyser is indicative of a level or composition of the atmosphere in the confined environment and the atmospheric pressure sensor or gas pressure sensor is indicative of an atmosphere pressure in the confined environment. In a particular embodiment hereof the control unit is adapted to continuously receive the signals of the gas analyser and of the atmospheric pressure sensor. By using an inventive system it is possible to calculate the metabolic coefficient in real time. A metabolic coefficient, which is a function of the oxygen consumption rate and carbon dioxide production rate of the produce has the inherent ability to characterise respiration and fermentation of the produce.

In this system the control unit is designed to generate an output signal to control the respiratory produce. This output system is designed to generate an output signal to control the metabolic activity of the produce, to protect the produce against metabolic disturbance, to protect the produce against degradation, to protect the produce against fermentative degradation.

In another aspect, the present invention provides also a temperature sensor and a control unit adapted to receive the signals of the temperature sensor and adapted to generate an output signal responsive to the temperature.

In another aspect, the present invention provides further comprising a volumetric sensor and a control unit adapted to receive the signals of the volumetric sensor and adapted to generate an output signal responsive to volume.

In another aspect, the present invention provides a control unit is furthermore adapted to continuously receive the signals of the temperature sensor and adapted to generate an output signal responsive to the temperature.

In another aspect, the present invention provides a control unit is that furthermore adapted to continuously receive the signals of the volumetric sensor and adapted to generate an output signal responsive to volume.

An example of an atmospheric pressure sensor suitable for present invention is a barometric pressure sensor.

Some of the systems described above may be embodied as a system, wherein the control unit is arranged to determine the adjusted gas medium composition based on a mathematical model of the system that at least uses measured gas composition and pressure at least two consecutive times over a selective time period in the confined environment to calculate in real time a metabolic coefficient; the adjusted gas medium composition being determined as a function of the calculated metabolic coefficient in the confined environment, whereby the metabolic coefficient is calculated in real time as the solution of the following system of equations:

$$\begin{cases} \frac{dn_i}{dt} = r_i m + \left( \frac{dn}{dt} - \sum_j (r_j) m \right) x_i^* \\ n_i = x_i \frac{PV}{RT}; n = \sum_i n_i \\ x_i^* = x_i H + x_{i,a}(1-H) \\ MC = f(r_i) \\ i = 1, \ldots, m \end{cases}$$

with $$\frac{d}{dt}$$

the rate of change with time, $x_i$ the measured mole fraction of gas i in the confined environment, P the measured pressure in the confined environment, V the volume of the confined space, T the temperature in the confined environment, R the universal gas constant, m the mass of respiratory produce in the confined environment, $r_i$ is the rate of exchange of the gas with the metabolically active produce and $f(f_i)$ a defined mathematical function of $r_i$ values. The mole fraction $x_i^*$ is defined by the function H that states that H=0 when ∂P/∂t is larger than or equal to 0 and H=1 when ∂P/∂t is smaller than 0.

In order to overcome the above-cited drawback, some of the systems described above may be embodied as a system wherein the control unit is arranged to determine the adjusted gas medium composition based on a mathematical model of the system that at least uses measured gas composition and pressure at least two consecutive times over a selective time period in the confined environment to calculate in real time a metabolic coefficient; the adjusted gas medium composition being determined as a function of the calculated metabolic coefficient in the confined environment, whereby the metabolic coefficient is the respiratory quotient of respiratory produce, and the gasses are $O_2$, $CO_2$ and $N_2$; the metabolic coefficient is calculated in real time as the solution of the following system of equations:

$$\begin{cases} \frac{dn_{O_2}}{dt} = -r_{O_2} m + \left( \frac{dn}{dt} - (r_{CO_2} - r_{O_2}) m \right) x_{O_2}^* \\ \frac{dn_{CO_2}}{dt} = r_{CO_2} m + \left( \frac{dn}{dt} - (r_{CO_2} - r_{O_2}) m \right) x_{CO_2}^* \\ \frac{dn_{N_2}}{dt} = \left( \frac{dn}{dt} - (r_{CO_2} - r_{O_2}) m \right) x_{N_2}^* \\ n_i = x_i \frac{PV}{RT}; n = \sum_i n_i \\ x_i^* = x_i H + x_{i,a}(1-H) \\ MC = \frac{r_{CO_2}}{r_{O_2}} \end{cases}$$

with $$\frac{d}{dt}$$

the rate of change with time, $x_i$ the measured mole fraction of gas i in the confined environment, P the measured pressure in the confined environment, V the volume of the confined space, T the temperature in the confined environment, R the universal gas constant, m the mass of respiratory produce in the confined environment, $r_{O_2}$ is the oxygen consumption rate of the respiratory produce and $r_{CO_2}$ is the carbon dioxide production rate of the respiratory produce. The mole fraction $x_i^*$ is defined by the function H that states that H=0 when ∂P/∂t is larger than or equal to 0 and H=1 when ∂P/∂t is smaller than 0.

In order to overcome the above-cited drawback, some of the systems described above may be embodied as a system wherein the control system comprises at least one gas analyser and at least one atmospheric pressure sensor connected to a control unit arranged to determine an adjusted gas medium composition of the confined storage environment for protecting the produce against fermentative degradation; and at least one operator/actuator arranged to adapt the gas medium in the confined storage environment based on said determined adjusted gas medium composition; wherein the control unit is arranged to determine the adjusted gas medium composition based on a mathematical model of the system that uses at least measured gas composition and pressure at two consecutive times over a selective time period in the defined confined storage environment to calculate in real time a metabolic coefficient that is a function of the oxygen consumption rate and carbon dioxide production rate of the produce that characterize respiration and fermentation; the adjusted gas medium composition being determined as a function of the calculated metabolic coefficient (MC) in the confined storage environment, whereby metabolic coefficient is calculated in real time as the solution of the following system of equations:

$$\begin{cases} \dfrac{dn_{O_2}}{dt} = -r_{O_2} m + \left( \dfrac{dn}{dt} - (r_{CO_2} - r_{O_2}) m \right) x^*_{O_2} \\ \dfrac{dn_{CO_2}}{dt} = r_{CO_2} m + \left( \dfrac{dn}{dt} - (r_{CO_2} - r_{O_2}) m \right) x^*_{CO_2} \\ \dfrac{dn_{N_2}}{dt} = \left( \dfrac{dn}{dt} - (r_{CO_2} - r_{O_2}) m \right) x^*_{N_2} \\ n_i = x_i \dfrac{PV}{RT}; n = \sum_i n_i \\ x^*_i = x_i H + x_{i,a}(1 - H) \\ MC = \dfrac{r_{CO_2}}{r_{O_2}} \end{cases}$$

with $$\frac{d}{dt}$$

the rate of change with time, $x_i$ the measured mole fraction of gas i in the confined environment, P the measured pressure in the confined environment, V the volume of the confined space, T the temperature in the confined environment, R the universal gas constant, m the mass of respiratory produce in the confined environment, $r_{O_2}$ is the oxygen consumption rate of the respiratory produce and $r_{CO_2}$ is the carbon dioxide production rate of the respiratory produce. The mole fraction $x_i^*$ is defined by the function H that states that H=0 when $\partial P/\partial t$ is larger than or equal to 0 and H=1 when $\partial P/\partial t$ is smaller than 0.

In a practical embodiment, these systems according to the present invention controls gas composition with respect to at least one of the following gasses oxygen, carbon dioxide, nitrogen, ethanol, acetaldehyde, ethylene, ethane, acetone.

In a further embodiment of the invention, the function for the metabolic coefficient is a linear or a nonlinear function of metabolic exchange rates of different relevant gasses with the produce.

In yet a further embodiment of the invention, the pressure and gas composition in the defined confined storage environment are measured continuously for a certain period of time.

In yet a further embodiment of the invention, the pressure and gas composition in the defined confined storage environment are measured periodically with a fixed or adaptive time interval for a certain period of time.

In yet another practical embodiment, the system according to the present invention comprises that the total measurement time and time intervals between subsequent measurements of gas composition and pressure are optimized such that the measured gas composition and pressure signals contain the maximal amount of information of the metabolic rates of respiration and fermentation and the least possible measurement noise. Furthermore the measured gas composition and pressure signals are subjected to signal processing to filter out measured noise.

In yet a further embodiment of the invention, besides the metabolic rates of respiration and fermentation, also the error of the estimated metabolic rates and metabolic coefficient are calculated.

In yet another aspect, the present invention provides, in the system according to any one of the previous embodiments, the calculated metabolic rates and/or metabolic coefficient are subjected to evaluation based on validity criteria based on the calculated errors of the metabolic rates, metabolic coefficient and pressure.

In yet another aspect, the present invention provides, in the system according to any one of the previous embodiments, the gas flows of oxygen gas, carbon dioxide gas and nitrogen gas, both from the environment of the confined space to the confined space itself as well as from the confined space to its environment due to leakage are taken into account to calculate the metabolic coefficient.

The system according to any one of the previous embodiments wherein carbon dioxide gas flow due to leakage from the environment to the confined space may neglected by the control algorithm when calculating the metabolic coefficient.

In yet another aspect, the present invention provides, in the system according to any one of the previous embodiments, the control system is adapted to calculate the adjusted gas composition as a function of the determined metabolic rates or coefficient.

In yet another aspect, the present invention provides, in the system according to any one of the previous embodiments, the control unit is adapted for comparing the calculated metabolic coefficient to the set point value of the metabolic coefficient, its integral or its differential and wherein the control unit is adapted for comparing the $CO_2$ level to the maximum tolerable concentration of the produce, for instance fruit or the control unit is also adapted for comparing the calculated metabolic coefficient to the set point value of the metabolic coefficient, its integral or its differential and wherein the control unit is adapted for comparing the $O_2$ level to the minimal tolerable concentration of the produce, for instance fruit or the control unit is also adapted for comparing the calculated metabolic coefficient to the threshold value of the metabolic coefficient and wherein the control unit is adapted for comparing the $O_2$ level to the minimal tolerable concentration of the produce, for instance fruit.

In yet another aspect, the present invention provides, in the system according to any one of the previous embodiments, the determined metabolic rates or metabolic coefficient is used to calculate the adjusted gas composition, whereby the gas composition in the confined storage space are maintained a fixed composition.

In yet another aspect, the present invention provides, in the system according to any one of the previous embodiments, the control unit comprises a PID controller for automatically calculating the future gas medium composition required to maintain the metabolic coefficient at safe levels.

In yet another aspect, the present invention provides, in the system according to any one of the previous embodiments, the control unit comprises a PID controller for automatically calculating the future gas medium composition required to maintain the metabolic coefficient at a certain set point value.

In yet another aspect, the present invention provides, in the system according to any one of the previous embodiments, the control unit comprises a model predictive control (MPC) for automatically calculating the future gas medium composition required to maintain the metabolic coefficient at safe levels.

In yet another aspect, the present invention provides, in the system according to any one of the previous embodiments, the operating or actuating means for adapting the gas composition in the confined storage environment comprises a means for flowing at least one gas into said the confined storage environment and a means for scrubbing at least one gas such as $CO_2$ or Ethylene.

Some of the systems described above may be embodied as the confined space subject to control, may have a constant volume; confined space subject to control, may have a constant temperature; the confined space are a reservoir inside another confined space such as a storage room; control system does not have to seal off the confined storage environment or part of the confined storage environment from gas flow in to or out of the confined storage environment from or to the external environment; control system does not have to estimate model parameters with uncertainty that may lead to introduction of errors in the estimates of the metabolic rates of respiration and fermentation and the metabolic coefficient and the control system does not have to estimate a leakage coefficient, equivalent leak hole diameter, pressure difference or pressure drop dynamics curve.

The present invention provides a system according to one any of the previous embodiments whereby only the internal pressure is used for leakage flow calculation without a leakage parameter (k)estimation; whereby due to the leakage disturbance correction mathematical model based on pressure driven leakage no equivalent leak hole diameter needs to be calculated or whereby dynamic control of relative gas composition in the confined environment is targeted instead of fixed relative gas composition.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

Several documents are cited throughout the text of this specification. Each of the documents herein (including any manufacturer's specifications, instructions etc.) are hereby incorporated by reference; however, there is no admission that any document cited is indeed prior art of the present invention.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn to scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to the devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Other embodiments of the invention will be apparent to those skilled in the art from consideration of the specification and practice of the invention disclosed herein.

It is intended that the specification and examples be considered as exemplary only.

Each and every claim is incorporated into the specification as an embodiment of the present invention. Thus, the claims are part of the description and are a further description and are in addition to the preferred embodiments of the present invention.

Each of the claims set out a particular embodiment of the invention.

The following terms are provided solely to aid in the understanding of the invention.

Definitions

Metabolically active produce is a complete or part (such as organs, tissues) of a living system that has an active metabolism; this produce can be from plants, animals, fungi and micro-organisms.

Respiratory produce is a complete or part (such as organs, tissues) of a living system that has a respiration metabolism; this produce can be from plants, animals, fungi and micro-organisms.

The enclosed environment is any physical enclosure into which the metabolically active produce can be placed.

The storage environment is one example of an enclosed environment that is used for storage of respiratory produce.

The metabolic coefficient (MC) is a coefficient which is directly related to the rate at which metabolic processes take place in the metabolic active produce.

The respiration coefficient (RQ) is the proportion of the rate of carbon dioxide production to the rate of oxygen consumption for the metabolic reactions that convert carbohydrates to water.

A controller is a device or system that controls the transfer of data from a computer to a peripheral device and vice versa, in particular the controller is the control unit of the system or device that receives and processes the data acquired from the confined storage environment.

Where in embodiments of the present invention reference is made to "operating/actuating means" or "operating means" or "actuating means", reference is made to a means for adapting or controlling a gas medium in the confined storage environment, e.g. in agreement with a determined adjusted gas medium composition. Such a system may be operated in an automated way based on control signals from the control unit or it may be operated by an operator based on an output of control signals from the control unit.

Where in embodiments of the present invention reference is made to "respiratory produce." or "respiring produce", reference is made to is a complete living system or part thereof, such as organs, tissues, having a respiration metabolism; this produce can for example be from plants, fruit, vegetables, animals, fungi and micro-organisms.

Where in embodiments of the present invention reference is made to a confined environment, for instance storage or growth environment, reference is made to any physical enclosure into which the respiratory produce can be placed, for instance a closable space for storing agricultural or horticultural products in a controlled atmosphere or for growing agricultural or horticultural products in a controlled atmosphere.

Where in embodiments of the present invention reference is made to a "control unit" or "controller", reference is made to a device for controlling the transfer and/or processing data from a computing device to a peripheral device and vice versa, e.g. receiving and processing the data acquired from the confined environment, for instance storage or growth environment.

Where in embodiments of the present invention reference is made to "operating/actuating means" or "operating means" or "actuating means", reference is made to a means for adapting or controlling a gas medium in the confined environment, for instance storage or growth environment, e.g. in agreement with a determined adjusted gas medium composition. Such a system may be operated in an automated way based on control signals from the control unit or it may be operated by an operator based on an output of control signals from the control unit.

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

In a first aspect, the present invention relates to a control system and method for controlling the storage of respiratory produce in a defined confined environment, for instance storage or growth environment.

The defined confined environment, for instance storage or growth environment, may be for example a room, a container, a box, a bin, a bag, a pallet bag, a conditioned storage deck on a ship, a conditioned trailer and a truck.

The respiratory produce may be any as described above, such as for example plant organs such as fruits, vegetables and flowers or entire plants.

The confined environment, for instance storage or growth environment, may be subject to variation due to a variation factor on the respiratory produce, due to the confined environment condition or a variation thereof and/or due to storage time.

DETAILED DESCRIPTION OF EMBODIMENTS OF THE INVENTION

A typical confined space filled with metabolic active produce is shown schematically in FIG. 2. The gas mixture inside the confined space consists of n gasses with molar concentration $c_i$. The free volume of the confined space is given by V and the internal pressure is given by P. The temperature in the confined space is given by T The environment of the confined storage space is assumed to have a known or measureable gas composition.

Changes in gas conditions inside the confined space are mainly caused by the metabolism of the stored produce. However, while the walls of the confined space may be assumed to be perfectly gastight, small imperfections in seals and seams of the confined space may allow gas flows between the confined space and its environment. The rate of change of the number of moles of the n gasses in the confined space is then given by:

$$\frac{dn_1}{dt} = r_1(c_1 \ldots c_n, T)m + q_1 \tag{1}$$

$$\frac{dn_i}{dt} = r_i(c_i \ldots c_n, T)m + q_i$$

$$\vdots$$

$$\frac{dn_n}{dt} = r_n(c_i \ldots c_n, T)m + q_n$$

with $n_i$ the number of moles of gas component i in the confined space, $$\frac{d}{dt}$$

the time derivative [s$^{-1}$], $r_i$ the metabolic rate of gas component i of the produce [mol kg$^{-1}$ s$^{-1}$], which is both dependent on the concentrations $c_i$ of all n gas components in the confined space [mol m$^{-3}$] as well as the temperature [K] in the confined space, m the mass of the stored metabolic active produce [kg] and $q_i$ the gas flows between the confined space and its environment due to leakage [mol s$^{-1}$].

The pressure in the confined space can then be calculated using the ideal gas law:

$$P = \sum_i n_i \frac{RT}{V} \qquad (2)$$

with P the pressure inside the confined space [Pa], R the universal gas constant [J mol$^{-1}$ K$^{-1}$], T the temperature of the confined space [K] and V the free volume of the confined space [m$^3$].

The mole fraction of each of the gasses in the confined space and its environment are defined as:

$$x_i = \frac{p_i}{P}, \; x_i = \frac{p_{i,a}}{P_a} \qquad (3)$$

with $x_i$ the gas fraction of gas component i in the confined space, $x_{i,a}$ the gas fraction of gas component i in the environment and $p_i$ the partial pressure of component i in the confined space.

A leakage model that describes the gas flows due to leakage for the gas components i=1 to n in the confined space, which takes into account the pressure and concentration driven gas transport between confined space and environment was developed, based on mass balances for each of gasses in the confined space. The total rate of change of the number of moles of gas component i . . . n in the confined space by leakage is given by:

$$\begin{cases} q_1 = -k(P-P_a)x_1^* - \frac{D_1 A_l}{\delta}\left(\frac{p_1}{RT} - \frac{p_{1,a}}{RT}\right) \\ \vdots \\ q_i = -k(P-P_a)x_i^* - \frac{D_i A_l}{\delta}\left(\frac{p_i}{RT} - \frac{p_{i,a}}{RT}\right) \\ \vdots \\ q_n = -k(P-P_a)x_n^* - \frac{D_n A_l}{\delta}\left(\frac{p_n}{RT} - \frac{p_{n,a}}{RT}\right) \\ x_i^* = x_i H + x_{i,a}(1-H) \end{cases} \qquad (4)$$

The first term on the right hand side of equation 4 represents pressure driven leakage while the second term represents concentration driven leakage. In equation 4, k represents the leakage constant of the cool room [mol s$^{-1}$ Pa$^{-1}$], $D_i$ the diffusivity of gas component i [m$^2$ s$^{-1}$], $A_l$ the area of the leakage of the confined space [m$^2$], $\delta$ the wall thickness of the confined space [m], $x_i^*$ is defined by the function H that states that H=0 when $P_a-P_i$ is larger than or equal to 0 and H=1 when $P_a-P_i$ is smaller than 0.

The model given by equation 4 was used to verify the relative contributions of diffusion and pressure driven flow for leakage.

If the diffusion driven terms can be neglected, equation set 4 can be simplified as:

$$\begin{cases} q_1 = -k(P-P_a)x_1^* \\ \vdots \\ q_i = -k(P-P_a)x_i^* \\ \vdots \\ q_n = -k(P-P_a)x_n^* \end{cases} \qquad (5)$$

Summation of the equations of equation set 1 using the ideal gas law leads to:

$$\frac{d\frac{PV}{RT}}{dt} = \sum_1^n (r_i m + q_i) \qquad (6)$$

Combining equation 5 with equation 6 we obtain:

$$\frac{d\frac{PV}{RT}}{dt} - m\sum_1^n r_i = -k(P-P_a) \qquad (7)$$

Substitution of equation 7 in equation 5 yields the following expression for the leakage gas flows:

$$\begin{cases} q_1 = \left(\frac{d\frac{PV}{RT}}{dt} - m\sum_1^n r_i\right)x_1^* \\ \vdots \\ q_i = \left(\frac{d\frac{PV}{RT}}{dt} - m\sum_1^n r_i\right)x_i^* \\ \vdots \\ q_n = \left(\frac{d\frac{PV}{RT}}{dt} - m\sum_1^n r_i\right)x_n^* \\ x_i^* = x_i Z + x_{i,a}(1-Z) \end{cases} \qquad (8)$$

The mole fraction $x_i^*$ is defined by the function Z that states that Z=0 when $$\partial \frac{PV}{RT}\bigg/\partial t$$

is larger than or equal to 0 and $Z=1$ when $$\partial \frac{PV}{RT} / \partial t$$

is smaller than 0.

Finally, filling in the expressions for the gas flows $q_i$ in equation set 1 yields:

$$\begin{cases} \frac{dn_1}{dt} = r_1 m + \left( \frac{d\frac{PV}{RT}}{dt} - m\sum_1^n r_i \right) x_1^* \\ \vdots \\ \frac{dn_i}{dt} = r_i m + \left( \frac{d\frac{PV}{RT}}{dt} - m\sum_1^n r_i \right) x_i^* \\ \vdots \\ \frac{dn_n}{dt} = r_i m + \left( \frac{d\frac{PV}{RT}}{dt} - m\sum_1^n r_i \right) x_n^* \\ x_i^* = x_i Z + x_{i,a}(1-Z) \end{cases} \quad (9)$$

Equation 9 allows one to calculate the changes of number of moles of the relevant gasses in the confined space due to leakage when the rate of change of internal system pressure and metabolic rates of the stored produce are known. When no produce is present in the confined space, the changes in the number of moles of the gasses is only determined by the leakage of gas, so equation 9 simplifies to:

$$\begin{cases} \frac{dn_1}{dt} = \frac{d\frac{PV}{RT}}{dt} x_1^* \\ \vdots \\ \frac{dn_i}{dt} = \frac{d\frac{PV}{RT}}{dt} x_i^* \\ \vdots \\ \frac{dn_n}{dt} = \frac{d\frac{PV}{RT}}{dt} x_n^* \end{cases} \quad (10)$$

The instantaneous metabolic coefficient can now be calculated by solution of equation set 9 and is a function of the metabolic rates of the produce:

$$MC = f(r_i) \quad (11)$$

While the average value of the metabolic coefficient over a certain period of time, say $t_f - t_0 = \Delta t$ is given by:

$$\overline{MC} = \frac{1}{\Delta t} \int_{t_0}^{t_f} MC(t) dt \quad (12)$$

where $\overline{MC}$ is the mean value of the metabolic coefficient and ∫dt represents the time integral.

The control system is robust against complicating factors (such as but not limited to changes in temperature, humidity, aging of the produce).

The actual implementation of this system is a considerable reduction in environmental control management efforts of the confined space as it only requires dynamic measurement of the pressure and gas concentrations in the room, rather than measurement of a leakage coefficient or implementing additional systems and procedures.

The actual implementation of this control system can be used for all types of storage environments such as rooms, halls, plant factories, containers, boxes, bins, bags, pallet bags, conditioned storage decks on ships, conditioned trailers and trucks of all dimensions.

It will be apparent to those skilled in the art that various modifications and variations can be made in construction of the system and method without departing from the scope or spirit of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

Example 1

This example concerns control of the gas composition in a cooled storage room (cool room) for respiratory produce, wherein the adjusted gas composition is calculated based on the respiratory quotient (RQ) as the metabolic coefficient. RQ is defined as the ratio of the carbon dioxide production rate and the oxygen consumption rate of the stored produce. It is a measure for low oxygen stress. When the stored produce does not experience low oxygen stress, RQ has a low value, usually around 1, but when low oxygen stress occurs, RQ shows a steep increase, making it a good indicator of low oxygen stress. The goal of using RQ to control the gas composition in a storage room for respiratory produce is therefore to store the produce the optimal adjusted gas composition, without triggering low oxygen stress in the fruit, to maximally preserve quality during storage.

A typical RQ-DCA storage room filled with fruit is shown schematically in FIG. 3. It is assumed that the gas mixture inside the room consists only of $O_2$, $CO_2$ and $N_2$ gas with gas partial pressures $p_{O_2,r}$, $p_{CO_2,r}$ and $p_{N_2,r}$, respectively. The effect of other gas components on the gas mixture composition is assumed to be negligible. Water vapor is excluded, since it follows from the psychrometric chart that the water vapor partial pressure, in any case, is lower than 0.6 kPa. The free volume of the cool room is given by V and the internal pressure is given by P. The temperature in the cool room is assumed to be uniform and constant. The environment of the cool room is assumed to be at ambient conditions, with atmospheric $O_2$, $CO_2$ and $N_2$ gas partial pressures given by $p_{O_2,a}$, $p_{CO_2,a}$ and $p_{N_2,a}$. The total atmospheric air pressure is given by $P_a$.

Changes in gas conditions inside the cool room are mainly caused by fruit respiration. However, while the wall panels of the cool room may be assumed to be perfectly gastight, small imperfections in seals and seams of the room may allow gas flows between the cool room and the environment. Gas flows of $O_2$, $CO_2$ and $N_2$ gas are given by $q_{O_2}$, $q_{CO_2}$ and $q_{N_2}$, respectively. The rate of change of the number of moles of the relevant gasses in the cool room is then given by:

$$\begin{cases} \frac{dn_{O_2}}{dt} = -r_{O_2}(p_{O_2,r}, p_{CO_2,r})m + q_{O_2} \\ \frac{dn_{CO_2}}{dt} = r_{CO_2}(p_{O_2,r}, p_{CO_2,r})m + q_{CO_2} \\ \frac{dn_{N_2}}{dt} = q_{N_2} \end{cases} \quad (13)$$

with $n_i$ the number of moles of gas component i in the cool room, $$\frac{d}{dt}$$

the time derivative [s$^{-1}$], $r_{O_2}$ the rate of oxygen consumption by the fruit [mol kg$^{-1}$ s$^{-1}$], and $r_{CO_2}$ the rate of carbon dioxide production by the fruit [mol kg$^{-1}$ s$^{-1}$], that are both dependent on $p_{O_2,r}$ the partial pressure of $O_2$ gas in the cool room [Pa], and $p_{CO_2,r}$ the partial pressure of $CO_2$ gas inside the cool room, m the mass of the stored fruit [kg] and $q_{O_2}$, $q_{CO_2}$ and $q_{N_2}$ the gas flows of $O_2$, $CO_2$ and $N_2$ due to leakage [mol s$^{-1}$].

The pressure in the cool room can then be calculated using the ideal gas law:

$$P = \sum_i n_i \frac{RT}{V} \quad (14)$$

with P the pressure inside the cool room [Pa], R the universal gas constant [J mol$^{-1}$ K$^{-1}$], T the temperature of the air in the cool room [K] and V the free volume of the facility [m$^3$].

The gas fraction of each of the gasses in the cool room and atmosphere is defined as:

$$x_{i,r} = \frac{p_{i,r}}{P}, \quad x_{i,a} = \frac{p_{i,a}}{P_a} \quad (15)$$

with $x_{i,r}$ the gas fraction of gas component i in the cool room, $x_{i,a}$ the gas fraction of gas component i in the ambient atmosphere and $p_{i,r}$ the partial pressure of component i in the cool room.

A leakage model describes the pressure and concentration driven gas transport between cool room and environment based on mass balances for each of the relevant gasses in the cool room. The total rate of change of the number of moles of the relevant gasses in the cool room by leakage is given by:

$$\begin{cases} q_{O_2} = -k(P - P_a)x^*_{O_2} - \frac{D_{O_2}A_l}{\delta}\left(\frac{p_{O_2}}{RT} - \frac{p_{O_2,a}}{RT}\right) \\ q_{CO_2} = -k(P - P_a)x^*_{CO_2} - \frac{D_{CO_2}A_l}{\delta}\left(\frac{p_{CO_2}}{RT} - \frac{p_{CO_2,a}}{RT}\right) \\ q_{N_2} = -k(P - P_a)x^*_{N_2} - \frac{D_{N_2}A_l}{\delta}\left(\frac{p_{N_2}}{RT} - \frac{p_{N_2,a}}{RT}\right) \\ x^*_i = x_i H + x_{i,a}(1 - H) \end{cases} \quad (16)$$

The first term on the right hand side of equation 16 represents pressure driven leakage while the second term represents concentration driven leakage. In equation 16, k represents the leakage constant of the cool room [mol s$^{-1}$ Pa$^{-1}$], $x_i^*$ is defined by the function H that states that H=0 when $P_a-P_i$ is larger than or equal to 0 and H=1 when $P_a-P_i$ is smaller than 0.

$D_i$ the diffusivity of gas component i in air at atmospheric pressure at 274.15 K [m$^2$ s$^{-1}$], $A_l$ the area of the leakage of the cool room [m$^2$] and $\delta$ the wall thickness of the cool room [m]. The model given by equation 16 was used to verify the relative contributions of diffusion and pressure driven flow for leakage.

If the diffusion driven terms can be neglected, equation 16 can be simplified as:

$$\begin{cases} q_{O_2} = -k(P - P_a)x^*_{O_2} \\ q_{CO_2} = -k(P - P_a)x^*_{CO_2} \\ q_{N_2} = -k(P - P_a)x^*_{N_2} \end{cases} \quad (17)$$

Summation of the equations of equation set 13, using the ideal gas law and assuming that the temperature and the free volume in the cool room are constant, leads to:

$$\frac{V}{RT}\frac{dP}{dt} = -r_{O_2}m + q_{O_2} + r_{CO_2}m + q_{CO_2} + q_{N_2} \quad (18)$$

Combining equation 17 with equation 18 we obtain:

$$\frac{V}{RT}\frac{dP}{dt} = -m(r_{CO_2} - r_{O_2}) = -k(P - P_a) \quad (19)$$

Substitution of equation 19 in equation 17 yields the following expression for the leakage gas flows:

$$\begin{cases} q_{O_2} = \left(\frac{V}{RT}\frac{dP}{dt} - (r_{CO_2} - r_{O_2})m\right)x^*_{O_2} \\ q_{CO_2} = \left(\frac{V}{RT}\frac{dP}{dt} - (r_{CO_2} - r_{O_2})m\right)x^*_{CO_2} \\ q_{N_2} = \left(\frac{V}{RT}\frac{dP}{dt} - (r_{CO_2} - r_{O_2})m\right)x^*_{N_2} \\ x^*_i = x_i Z + x_{i,a}(1 - Z) \end{cases} \quad (20)$$

Where the mole fraction $x_i^*$ is defined by the function Z that states that Z=0 when $\partial P/\partial t$ is larger than or equal to 0 and Z=1 when $\partial P/\partial t$ is smaller than 0.

Finally, filling in the expressions for the gas flows of $O_2$, $CO_2$ and $N_2$ in equation 13 yields:

$$\begin{cases} \frac{dn_{O_2}}{dt} = -r_{O_2}m + \left(\frac{V}{RT}\frac{dP}{dt} - (r_{CO_2} - r_{O_2})m\right)x^*_{O_2} \\ \frac{dn_{CO_2}}{dt} = r_{CO_2}m + \left(\frac{V}{RT}\frac{dP}{dt} - (r_{CO_2} - r_{O_2})m\right)x^*_{CO_2} \\ \frac{dn_{N_2}}{dt} = \left(\frac{V}{RT}\frac{dP}{dt} - (r_{CO_2} - r_{O_2})M\right)x^*_{N_2} \end{cases} \quad (21)$$

Equation 21 allows one to calculate the changes of number of moles of the relevant gasses in the cool room due to leakage when the rate of change of internal system pressure and respiration rates of the fruit are known. When no fruit is present in the cool room, the changes in the number of moles of the relevant gasses is only determined by the leakage of gas, so equation 21 simplifies to:

$$\begin{cases} \frac{dn_{O_2}}{dt} = \frac{V}{RT}\frac{dP}{dt}x^*_{O_2} \\ \frac{dn_{CO_2}}{dt} = \frac{V}{RT}\frac{dP}{dt}x^*_{CO_2} \\ \frac{dn_{N_2}}{dt} = \frac{V}{RT}\frac{dP}{dt}x^*_{N_2} \end{cases} \quad (22)$$

The respiratory quotient (RQ) is defined as the ratio of the $CO_2$ production rate to the $O_2$ consumption rate. It can be estimated by dividing the change of the $CO_2$ concentration by that of the $O_2$ concentration in the cool room during a certain time interval. Because the ambient $CO_2$ and $O_2$ partial pressure are typically smaller and larger than that of the cool room, respectively, leakage causes the RQ to be overestimated and may even become negative. Its estimate can be corrected for the measured changes in respiratory gasses which are not due to respiration, but due to leakiness of the cool room. We start by rearranging the last equation of set of equations 19, which describes the rate of change of moles of $N_2$ gas in the room and contains only information about the leakage:

$$\begin{cases} \frac{dn_{O_2}}{dt} = -r_{O_2}m + \left(\frac{V}{RT}\frac{dP}{dt} - (r_{CO_2} - r_{O_2})m\right)x^*_{O_2} \\ \frac{dn_{CO_2}}{dt} = r_{CO_2}m + \left(\frac{V}{RT}\frac{dP}{dt} - (r_{CO_2} - r_{O_2})m\right)x^*_{CO_2} \\ \frac{1}{x^*_{N_2}}\frac{dn_{N_2}}{dt} = \left(\frac{V}{RT}\frac{dP}{dt} - (r_{CO_2} - r_{O_2})m\right) \end{cases} \quad (23)$$

Substitution of the last equation of equation set 19 into the first two equations yields:

$$\begin{cases} \frac{dn_{O_2}}{dt} = -r_{O_2}m + \frac{1}{x^*_{N_2}}\frac{dn_{N_2}}{dt}x^*_{O_2} \\ \frac{dn_{CO_2}}{dt} = r_{CO_2}m + \frac{1}{x^*_{N_2}}\frac{dn_{N_2}}{dt}x^*_{CO_2} \end{cases} \quad (24)$$

We now rearrange equation 24 and use the ideal gas law to obtain:

$$\begin{cases} r_{O_2} = \frac{1}{m}\left(\frac{V}{RTx^*_{N_2}}\frac{d}{dt}(x_{N_2}P)\right)x^*_{O_2} - \frac{V}{RTm}\frac{d}{dt}(x_{O_2}P) \\ r_{CO_2} = \frac{V}{RTm}\frac{d}{dt}(x_{CO_2}P) - \frac{1}{m}\left(\frac{V}{RTx^*_{N_2}}\frac{d}{dt}(x_{N_2}P)\right)x^*_{CO_2} \end{cases} \quad (25)$$

Finally, using the definition of RQ results in:

$$RQ = \frac{r_{CO_2}}{r_{O_2}} = \frac{\frac{d}{dt}(x_{CO_2}P) - \left(\frac{1}{x^*_{N_2}}\frac{d}{dt}(x_{N_2}P)\right)x^*_{CO_2}}{\left(\frac{1}{x^*_{N_2}}\frac{d}{dt}(x_{N_2}P)\right)x^*_{O_2} - \frac{d}{dt}(x_{O_2}P)} \quad (26)$$

Equation 26 is an expression for instantaneous RQ at a certain time point and, therefore, is written as a function of the time derivatives describing the instantaneous changes of the partial pressure of $O_2$, $CO_2$, and $N_2$ gas in the cool room and total internal pressure. Equation 26 was solved using a Backward Euler numerical scheme to obtain momentaneous RQ values RQ(t). In practice, one is often interested in the mean value of RQ(t) over a certain period of time. Thereto, we define the average RQ ($\overline{RQ}$) of the stored fruit, over a time interval say $t_f - t_0 = \Delta t$, which is the RQ measurement period, as:

$$\overline{RQ} = \frac{1}{\Delta t}\int_{t_0}^{t_f} RQ(t)dt \quad (27)$$

For validation of the pressure based leak correction, storage containers and accompanying RQ-DCA control units for automatic RQ-DCA control were used. The simplified leakage model given by equation 22 was validated using an empty storage container with a volume of 0.4 m³. CA conditions were set to typical RQ-DCA conditions of 0.4 kPa $O_2$ and 1.3 kPa $CO_2$. Subsequently, CA and temperature control were disabled for a time period of 2 h during which $O_2$, $CO_2$ and the internal pressure P were monitored. Measurements were conducted during 2 h of decreasing as well as 2 h of increasing atmospheric air pressure. Equation 22 was used to predict changes in gas partial pressures using measured internal pressure as input. Subsequently, predicted changes in gas composition were compared to measured changes in gas partial pressure. In a second step, estimates of the RQ of the stored produce with and without pressure based leak correction were compared. Hereto, real-time estimates of RQ with and without leakage correction, the storage container was loaded with 4 European Packing Standard (EPS) boxes each loaded with 19±0.5 kg of Braeburn apple fruit (*Malus* x *domestica* Borkh. cv. Braeburn). Apples were harvested at 1 Oct. 2014, south of Toulouse (France). Unsorted apples were chilled and transported by chilled transport to the lab where they arrived on 3 Oct. 2014, having a temperature of 6° C.

Control of $O_2$ was conducted according to the RQ-DCA control algorithm using RQ estimates with leakage correction. In brief, the $O_2$ partial pressure in the storage container was decreased by 0.05 kPa if RQ was smaller than 2. When RQ was larger than 2, the $O_2$ partial pressure was increased with 0.1 kPa. However, for the control system to take action, the measured RQ had to be valid. If this was not the case, the $O_2$ setpoint was not adapted. RQ values with leakage disturbance correction were used for $O_2$ control. Simultaneously with RQ estimates with leakage disturbance correction, RQ estimates without leakage correction were recorded and compared to the RQ estimates with leakage correction.

FIGS. 4(a) and 4(b) illustrate the results of the validation experiment using an empty storage container. It shows the measured pressure in the empty storage container (full line) and measured atmospheric air pressure (dashed line) as a function of time for a time period of 2 h as well as the measured and predicted $O_2$ and $CO_2$ partial pressures using the developed leakage correction model during an increase of internal pressure (FIG. 4(a)) and during a decrease of internal pressure (FIG. 4(b)) at a typical DCA condition of 0.5 kPa $O_2$ and 1.5 kPa $CO_2$. FIG. 4(a) clearly indicates that the pressure inside the cool room increased when the atmospheric air pressure increased. The internal container pressure increased from 1006.19 hPa to 1009.28 hPa in response to an increase in atmospheric pressure from 1006.7 hPa to 1009.22 hPa in a time period of 2 h. Since the storage container used in the validation experiment contained no fruit, the $O_2$ partial pressure increased as a function of time from an initial value of 430 Pa to a final value of 490 Pa during the experiment due to an influx of atmospheric air from the environment into the cool room, as shown by the light blue line in FIG. 4(a). The full line shows the predicted $O_2$ partial pressure in the storage container as a function of time using the developed leakage correction method. The predicted and measured $O_2$ partial pressures differ only from each other within the range of the resolution of the sensor used (10 Pa). The $CO_2$ partial pressure remained constant at 1330 Pa during the time period of 4 hours as indicated in FIG. 4(a) by the full line with o symbols. The full line without o symbols shows the predicted $CO_2$ partial pressure using the developed leakage model. Also here, the predicted and measured $CO_2$ partial pressures differ only from each other within the range of the resolution of the sensor used. The excellent correlation between measured and predicted $O_2$ and $CO_2$ partial pressures in the validation experiment, indicates that the developed leakage model performed well. When comparing the measured changes in $O_2$ and $CO_2$ partial pressures during the 2 h of increasing atmospheric pressure, one can see that the change of the $O_2$ partial pressure was significantly higher compared to that of the $CO_2$ partial pressure.

As illustrated in FIG. 4(b), during decreasing atmospheric pressure, the pressure inside the storage container decreased from an initial value of 1022.18 hPa to a final value of 1021.50 hPa as a response to a decrease in atmospheric air pressure from 1022.20 hPa to 1021.54 hPa during a time period of 2 h (FIG. 4(b)). The $O_2$ partial pressure in the storage container decreased from a partial pressure of 460 Pa to 450 Pa during the time period of 2 h. The $CO_2$ partial pressure decreased from a partial pressure of 1010 Pa to 1000 Pa during the time period of 2 h.

The excellent fit of the simulated gas composition using the pressure based leak model to the measured gas composition in the validation experiment can be explained looking to the physical nature of pressure and concentration driven processes. According to state of the art recommendations of gas tightness, leakage areas smaller than $2 \times 10^{-5}$ $m^2$ per $m^3$ storage volume and preferably smaller than $1.5 \times 10^{-5}$ $m^2$ $m^{-3}$ are advised (Veltman, 2013). In addition to the area over which the transport occurs, a second parameter determining the rate of diffusion of respiratory gasses in and out of the cool room are the Fick diffusivities for $O_2$ and $CO_2$ in air at atmospheric pressure. These diffusivities are typically in the order of magnitude of $10^{-5}$ $m^2$ $s^{-1}$. From eq. 4, it follows that the time constant of the diffusion process $\tau_{dif}$ (s) is $$\tau_{dif} = \frac{\delta}{DA_l}.$$

Filling in the diffusivities of $O_2$ or $CO_2$ along with the values for $A_l$ and $\delta$ delivers a value of $7.14 \times 10^{13}$ s. This is a very large value, indicating that the diffusion process is very slow.

Pressure differences between the cool room and environment due to changes in atmospheric air pressure create a momentum source, leading to movement of a bulk flow of gas between cool room and environment at a much higher rate. As shown by equation 17, the rate at which gas exchange between cool room and environment occurs is proportional to the pressure difference, with the k-value [mol $s^{-1}$ $Pa^{-1}$] as a proportionality constant. The time constant of the diffusion process $\tau_{pres}$ (s) is given by $$\tau_{pres} = \frac{V}{kRT}.$$

Filling in the volume of the storage container used (0.4 $m^3$) along with the estimated k-value, gas constant and temperature, yields a value of 1.17 s. The time constant of the pressure driven leakage was found to be 13 orders of magnitude smaller, indicating the pressure driven leakage is much faster. Therefore, leakage of postharvest storage facilities may be considered to be a pressure driven process.

FIGS. 5(a) to 5(c) illustrate the real-time application of the pressure based leakage correction model to obtain RQ estimates during a time period of 4 d in the storage container loaded with Braeburn apple fruit. FIG. 5(a) depicts the evolution of internal pressure in the storage container filled with apple fruit as a function of time during a period of 4 d, while FIG. 5(b) shows the corresponding $O_2$ setpoint and measured $O_2$ partial pressure and (c) the measured RQ values. When the atmospheric air pressure remains constant or decreases, the RQ estimates with and without leakage correction are almost equal, as illustrated by the first 4 RQ measurements in FIG. 5(c). Subsequently, when atmospheric air pressure increases, the estimated RQ without leakage correction (e.q. (17)) suddenly deviates from the RQ estimate with leakage correction (eq. (15)). Depending on the rate of pressure change, the RQ without leakage correction is now negative or larger than the RQ with leakage correction. This is illustrated by the $5^{th}$ to $7^{nd}$ RQ measurement, respectively, in FIG. 5(c). Furthermore, one can see that application of the developed leakage correction, delivers RQ estimates during increasing atmospheric air pressure with the same RQ value as the RQ value obtained during the previous RQ measurement period while the atmospheric air pressure was decreasing as shown in FIG. 5(c) by the $7^{nd}$ and $8^{th}$ RQ measurement. This confirms that the developed leakage correction is reliable and yields accurate RQ estimates during both decreasing and increasing atmospheric air pressures.

FIG. 5(b) shows the result of the RQ-DCA control of the $O_2$ partial pressure in the storage container based on the obtained RQ estimates with leakage correction. Since during the first six RQ-measurements in FIG. 5(b), RQ estimates were below the threshold value of 2, the $O_2$ partial pressure decreased with 0.05 kPa after each measurement. This led to a gradual increase of the RQ until low $O_2$ stress was detected by RQ estimates greater than 2 by the $7^{th}$ and the $8^{th}$ RQ estimation. The $O_2$ partial pressure was subsequently increased with 0.1 kPa until the estimated RQ dropped again below 2, indicating relief of low $O_2$ stress. This process was continuously repeated for a time period of 4 d.

In FIGS. 5(a) to 5(c) it was shown that large errors occur in RQ estimation when leakage of the cool room is not taken into account. The large errors found offer a plausible explanation for the highly pressure dependent RQ estimates. Also, they explain the high variation in RQ measurements reported in other recent research in the field, where the RQ of stored fruit was estimated based on measured changes in gas partial pressure of $O_2$ and $CO_2$ over a time period of 24 h and leakage of the cool room was not taken into account [1], [2].

RQ estimates without leakage correction tend to overestimate the real value of the RQ of the stored fruit, leading to false signs of low $O_2$ stress of the stored fruit. As a consequence, the $O_2$ partial pressure in the cool room will be increased. This leads to an increased number of control actions (increased usage of $O_2$ and $N_2$ gas) and, therefore, increase the variable cost of RQ-DCA storage. Also, the energy efficiency of RQ-DCA storage will be reduced, since a higher $O_2$ partial pressure in the cool room increase respiration and thus heat production. Lastly, storing the fruit at a higher $O_2$ partial pressure might cause suboptimal quality preservation during storage.

FIGS. 5(a) to 5(c) also showed that a large discrepancy between RQ estimates with hand without pressure based leak correction was observed when internal pressure increases, but not when internal pressure decreases. When the atmospheric air pressure increases in time, the cool room is at a small underpressure relative to its environment. Ambient air then flows inside the cool room leading to increasing internal pressure and may change the internal gas composition significantly. As observed, the effect of the inflow of gas with atmospheric composition into the storage container had a different effect on the $O_2$ and $CO_2$ partial pressure. The difference in partial pressure between the inside of the storage container and the environment is much larger for $O_2$ than for $CO_2$. Therefore, the effect of inflow of a certain amount of atmospheric air into the storage container has a larger effect on the change in $O_2$ partial pressure compared to the change in $CO_2$ partial pressure.

During decreasing atmospheric air pressure, both the $O_2$ and $CO_2$ partial pressures slightly decreased. Note that gas composition inside the storage container was not altered. Because during decreases in atmospheric air pressure the cool room is at a small overpressure relative to its environment, air with composition of the gas mixture inside the storage container flows to the environment and does not affect the composition of the gas mixture inside the storage container. Since partial pressure is the combined effect of gas fraction and total pressure, this led to a slight decrease in internal gas partial pressure for $O_2$ and $CO_2$.

It is thus shown that RQ estimations without pressure correction are only reliable during decreasing internal pressure of the storage facility i.e. when the composition of the storage atmosphere is not altered by leakage. The RQ estimation with leakage correction was able to estimate the RQ of the stored fruit in all circumstances.

Example 2

This example concerns an analysis of the error made by RQ estimated with and without pressure based leak correction and a comparison of the errors made to the real RQ value of the stored respiratory produce.

The relative error of the RQ calculation with and without pressure based leakage correction was calculated using a validated respiration model of 'Braeburn' apple fruit. Errors were subsequently compared to the real RQ value of the fruit. The analysis was conducted for a range of monotonic changes in internal pressure between −250 Pa and 250 Pa due to leakage and respiration rates matching with RQ values of 1, 1.5, 2 and 2.5, respectively. A time interval of 4 h was used along with a volume fruit to volume cool room ratio of 0.16 $m^3$ $m^{-3}$. The temperature was set to be 274.15 K. Respiration model parameters that were used are listed in Table 1.

TABLE 1

Model parameters of the 'Braeburn' intact apple fruit respiration model at 274.15 K, ± indicates the standard error of the estimated parameter value.

| Model parameter | Value | Units |
| --- | --- | --- |
| $V_{m,O2}$ | $4.78 \times 10^{-5} \pm 0.43$ | mol m$^{-3}$ s$^{-1}$ |
| Ea, $V_{mO2}$ | $69.9 \pm 4.8$ | kJ mol$^{-1}$ |
| $V_{mfCO2}$ | $7.11 \times 10^{-5} \pm 0.43$ | kPa |
| Ea, $V_{mfCO2}$ | $65.9 \pm 4.3$ | kJ mol$^{-1}$ |
| $K_{mO2}$ | $2.78 \pm 0.6$ | kPa |
| $K_{mnCO2}$ | $192 \pm 199$ | kPa |
| $K_{mfCO2}$ | $1.23 \pm 0.24$ | kPa |
| $RQ_{ox}$ | $0.80 \pm 0.06$ | [—] |

A respiration model of Braeburn apple fruit (*Malus* x *Domestica* cv. Braeburn) was developed. Respiration rate measurements of intact Braeburn fruit in short, were conducted using 1.7 L jars. A full factorial experiment was conducted at 0, 1, 3, 5, 10 and 20 kPa $O_2$ in combination with 0 kPa $CO_2$ and a temperature of 5, 10 and 20° C. The inhibition effect of $CO_2$ on the respiration rate was determined at 5, 10 and 20° C. in combination with 10 kPa $CO_2$. A non-competitive inhibition model was used to describe the $O_2$ consumption rate:

$$r_{O_2} = \frac{V_{m,O_2} P_{O_2}}{(K_{m,O_2} + P_{O_2}) \cdot \left(1 + \frac{P_{CO_2}}{K_{mn,CO_2}}\right)} \quad (28)$$

with $V_{m,O_2}$ the maximal $O_2$ consumption rate [mol m$^{-3}$ s$^{-1}$], $P_{O_2}$ the $O_2$ partial pressure [kPa], $P_{CO_2}$ the $CO_2$ partial pressure [kPa], $K_{m,O_2}$ the Michaelis-Menten constant for $O_2$ consumption [kPa] and $K_{mn,CO_2}$ the Michaelis-Menten constant of non-competitive $CO_2$ inhibition of the $O_2$ consumption rate.

The equation of the $CO_2$ production rate consists of an oxidative respiration and a fermentation part:

$$r_{CO_2} = -RQ_{ox} r_{O_2} \frac{V_{m,f,CO_2}}{\left(1 + \frac{P_{O_2}}{K_{m,f,O_2}}\right)} \quad (29)$$

with $RQ_{ox}$ the RQ at high $O_2$ partial pressure [−], $r_{O_2}$ the rate of $O_2$ consumption [mol m$^{-3}$ s$^{-1}$], $V_{m,f,CO_2}$ the maximal fermentative $CO_2$ production rate, and $K_{m,f,O_2}$ the Michaelis-Menten constant of $O_2$ inhibition on fermentative $CO_2$ production. The temperature effect was described using Arrhenius' law. Respiration model parameters were estimated by fitting equations (28) and (29) to the experimental data using a nonlinear least squares regression in Matlab R2015b.

As FIGS. 6(a) to 6(d) depicts, it was shown that large errors occur in RQ estimation when no pressure based leak correction is applied Also, the error was shown to increase with increasing RQ. The smallest errors of RQ estimates without leakage correction were found when the RQ of the stored fruit is equal to 1 (up to 139%), while the largest relative errors (up to 746%) were found when RQ had a value of 2.5, the maximal RQ investigated. Again, this example shows that the large errors found offer a plausible explanation for highly pressure dependent RQ estimates. Also, they explain the high variation in RQ measurements reported in other recent research in the field, where the RQ of stored fruit was estimated based on measured changes in gas partial pressure of $O_2$ and $CO_2$ over a time period of 24 h and leakage of the cool room was not taken into account (V. Both, F. Rodrigo, A. Brackmann, R. De Oliveira, D. De Freitas, and R. Wagner, "Effects of dynamic controlled atmosphere by respiratory quotient on some quality parameters and volatile profile of 'Royal Gala' apple after long-term storage," Food Chem., vol. 215, pp. 483-492, 2017; A. Weber, A. Brackmann, V. Both, E. P. Pavanello, R. D. O. Anese, and F. Rodrigo, "Respiratory quotient: innovative method for monitoring 'Royal Gala' apple storage in a dynamic controlled atmosphere," Food Science And Technology no. February, pp. 28-33, 2015).

Example 3

This example concerns the calculation of the standard error of the obtained RQ estimates and its subjection to testing to comply with validity criteria. The standard error of the RQ estimate is calculated every minute based on the estimated standard errors of the approximations of the time derivatives in equation 26 as illustrated in FIG. 7. Standard error of approximations of the time derivatives necessary to calculate the RQ estimate are calculated every minute. Standard errors are used to test statistically if the measured changes in gas composition and pressure represented by approximations of the time derivatives in equation 26 are significant. If so, RQ estimates are calculated together with the standard error of the RQ estimate.

For the control system to take action, the estimated RQ value will be tested to comply with validity criteria. Validity criteria used by the control system are:

The rate change of pressure based leak corrected $O_2$ as a function of time should be negative,
The rate of change of pressure based leak corrected $CO_2$ as a function of time should be positive,
The rate change of pressure based leak corrected $O_2$ as a function of time should be statistically significant,
The rate of change of pressure based leak corrected $CO_2$ as a function of time should be statistically significant,
The obtained RQ value should be greater than a lower threshold value,
The confidence internal of the RQ estimate should not contain 0.

Disclaimers

1. The proposed control method based on a metabolic coefficient of the produce takes into account the gas exchange dynamics of the produce as well as the gas exchange dynamics of the storage environment by measuring continuously the gas composition and pressure changes.
2. The control is based on a mathematical model that calculates the metabolic rates of the produce from the measured dynamic changes in gas composition and pressure without the need of determining independently a leakage parameter.
3. The control system does not require that the confined system conditions, in particular atmospheric pressure, are modified to compensate leakage during the measurement period.
4. The control system calculates the error of the metabolic coefficient to ensure a robust operation of the system.
5. The control system will automatically adapt the gas concentrations in the storage environment when changes occur in the metabolic activity of the produce, when the amount of produce in the confined environment changes, when gas and temperature conditions in the confined environment changes, or when the design or structure of the confined environment changes.
6. The control system can be applied to any metabolic produce and any confined system.
7. The control system is not limited by constraints on temperature, humidity, gas concentrations, the amount and type produce, or the dimensions of the confined environment.

DRAWING DESCRIPTION

Brief Description of the Drawings

The present invention will become more fully understood from the detailed description given herein below and the accompanying drawings which are given by way of illustration only, and thus are not limitative of the present invention, and wherein:

FIGS. 6(a) to 6(d): Estimated values of the RQ of stored apple fruit as a function of pressure changes inside the room. Pressure based leakage correction represented by the green line and without pressure based leakage correction represented by the red line for different real RQ values of the stored fruit equal to 1.0 (a), 1.5 (b), 2 (c) and 2.5 (d).

Figure 1:
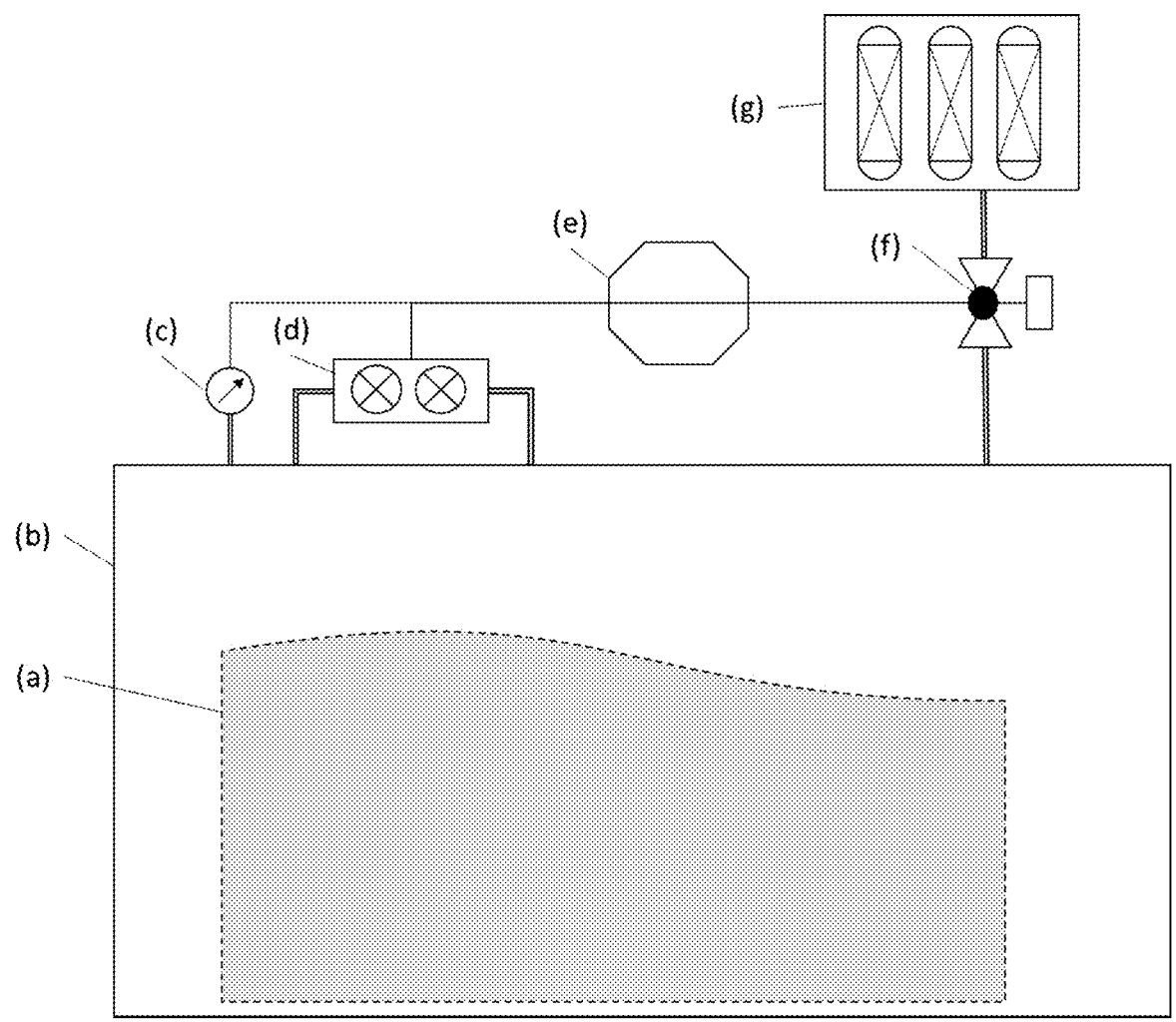
FIG. 1 is a schematic view showing the details of the pressure-corrected control system based on a software assisted measurement system and control algorithm. The metabolically active produce (a) is contained in a confined environment (b). The pressure is measured with a pressure sensor (c) and the gas composition with a gas analyzer (d). The signals of the pressure sensor and gas analyzer are used by the control unit (e) to calculate a metabolic coefficient of the produce (a) that is used to calculate an output signal. The control unit output signal drives the operator/actuator (f) to adjust the gas composition in the confined environment using a gasses supplied from a gas control unit (g).
Figure 2:
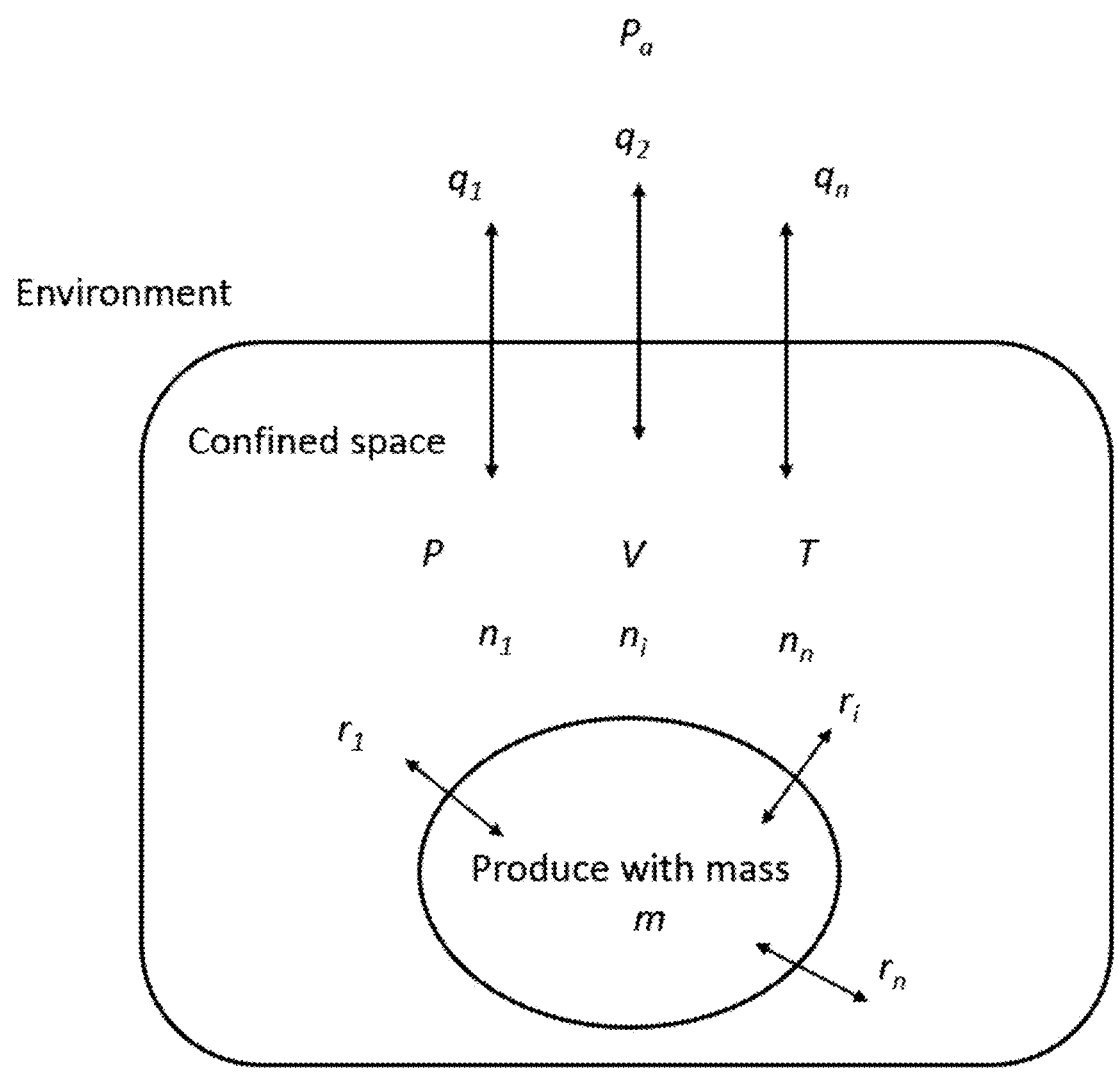
FIG. 2 is a schematic view of a confined space. The confined space contains metabolic active produce with mass M. The number of moles of the n different gasses present in the confined space is given by $n_1$ to $n_n$. The confined space has a free volume V, temperature T and internal pressure P. Due to its metabolic activity, gasses are consumed or produced with rate $r_1$ to $r_n$. The immediate environment of the confined space is at pressure $P_a$. Given the confined space is not perfectly gastight, gas flows due to pressure driven leakage as occur, represented by $q_1$ to $q_n$.
Figure 3:
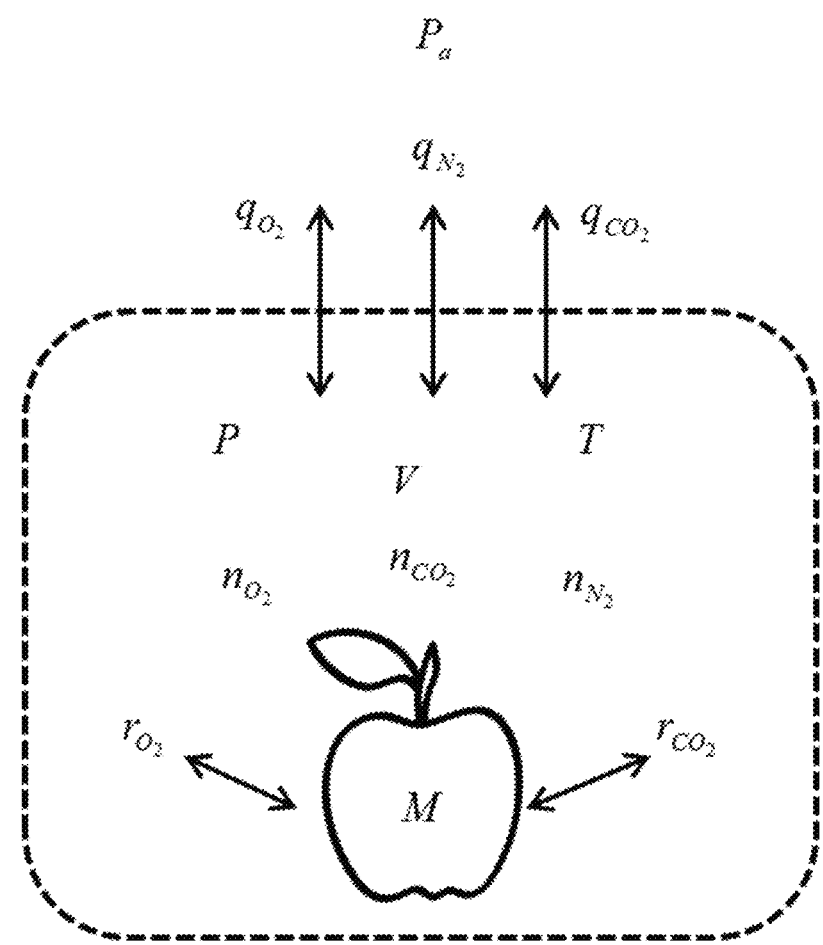
FIG. 3 is a schematic view of a cooled storage room (cool room), indicated by a dashed line to stress the cool room is not perfectly gastight. The cool room contains respiratory produce with mass M. The number of moles of oxygen, carbon dioxide and nitrogen gas is given by $n_{O2}$, $n_{CO2}$ and $n_{N2}$ respectively. The cool room has a free volume V, temperature T and internal pressure P. Due to its metabolic activity, the fruit is respiring and so consuming oxygen and producing carbon dioxide gas with rates $r_{O2}$ and $r_{CO2}$ respectively. The immediate environment of the cool room, in this case atmospheric air, has atmospheric pressure $P_a$. Given the cool room is not perfectly gastight, gas flows due to pressure driven leakage of oxygen, carbon dioxide and nitrogen gas occur, represented by $q_{O2}$, $q_{CO2}$ and $q_{N2}$ respectively.
Figure 4A:
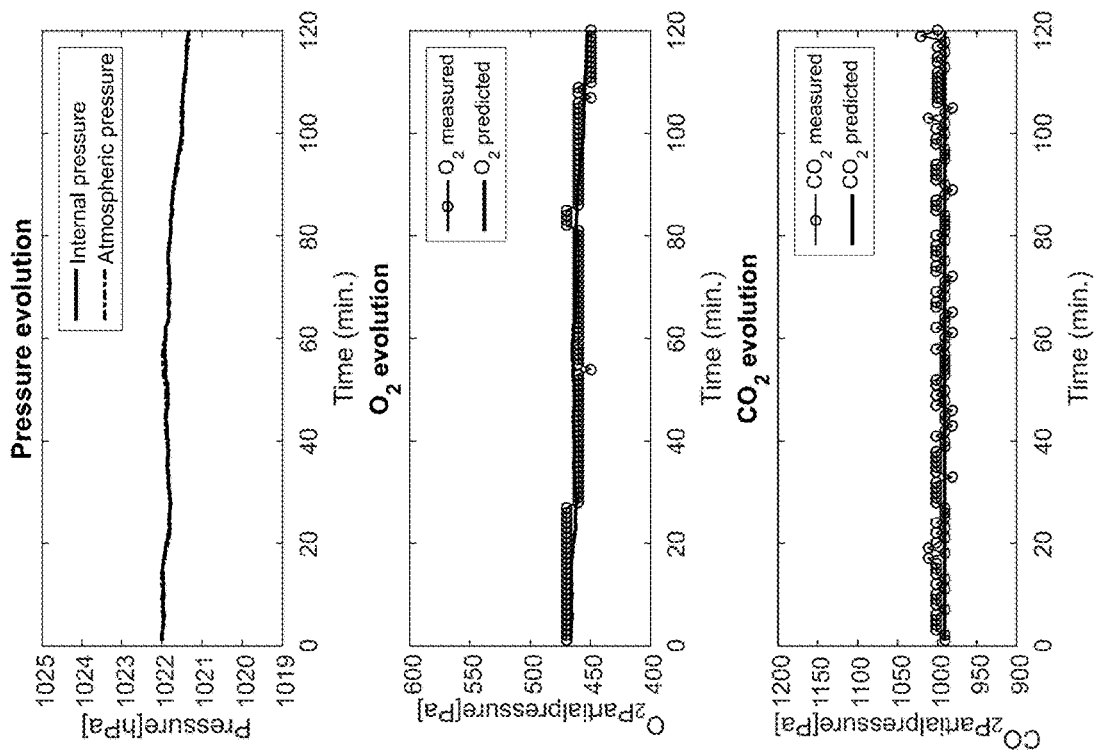
FIGS. 4(a) and 4(b) depict the atmospheric (fullline) and internal pressure (dashed line) and measured (full line) and simulated (full line, o symbol) $O_2$ partial pressures as well as measured (full line) and simulated (full line, o symbol) $CO_2$ partial pressures during a time period of 120 minutes with increasing 4(a) and decreasing 4(b) internal pressure during the validation experiment in an empty storage container. The simulated gas using the pressure based leakage model fits the measured gas composition excellently, indicating the high accuracy of the pressure based leakage model.
Figure 4B:
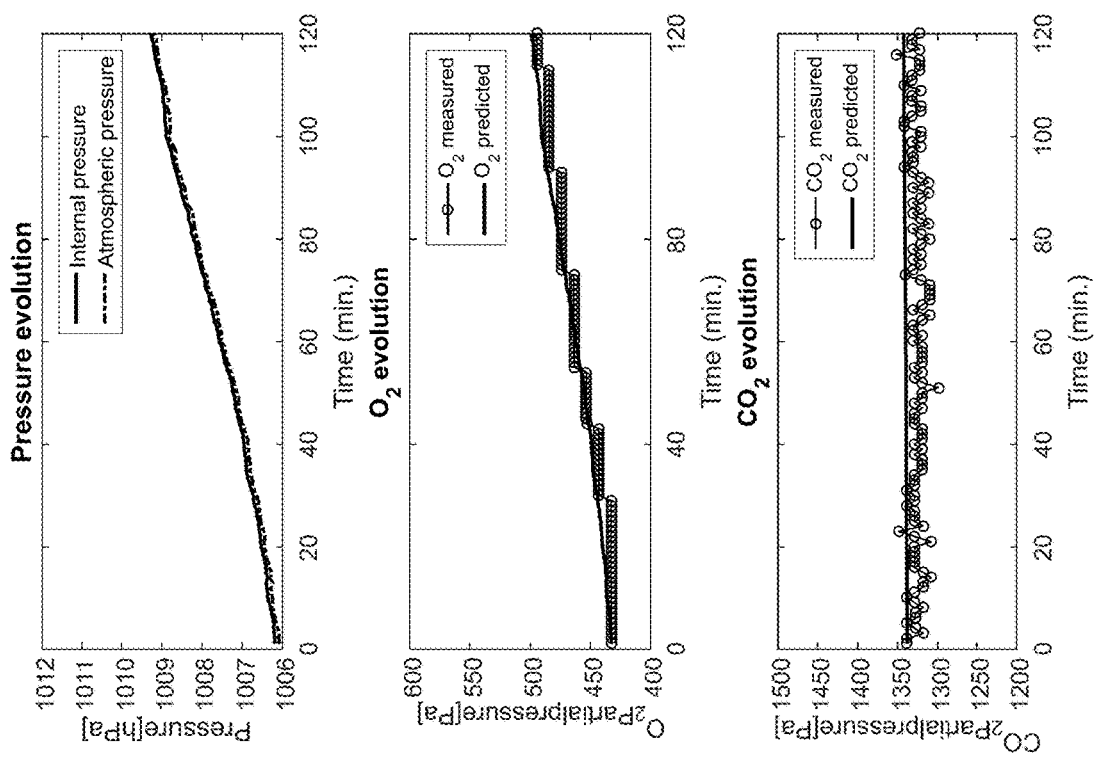
Figure 5A:
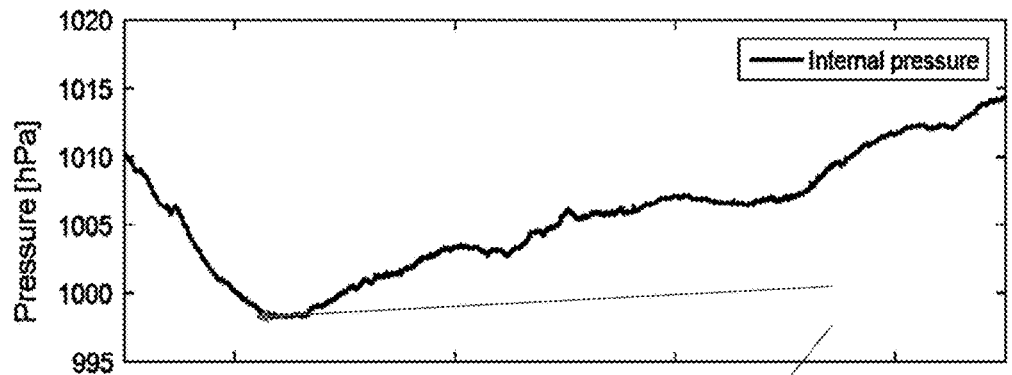
FIGS. 5(a) to 5(c) show the results of the demonstration of the pressure based leak-corrected RQ measurement and resulting control of the gas composition for apple storage where 5(a) shows the measured internal pressure, 5(b) measured and setpoint $O_2$ partial pressures (dashed line and full lines respectively) and 5(c) corresponding RQ estimation with (upward pointing triangle) and without (downward pointing triangle) pressure based leak correction. It is shown that RQ estimates with leakage correction deliver reliable values of the RQ of the stored produce both during decreasing as well as increasing internal pressure, while RQ estimates without leak correction deliver reliable RQ values when internal pressure decreases and leak occurs from the storage space to the environment, not significantly altering the internal gas composition.
Figure 5B:
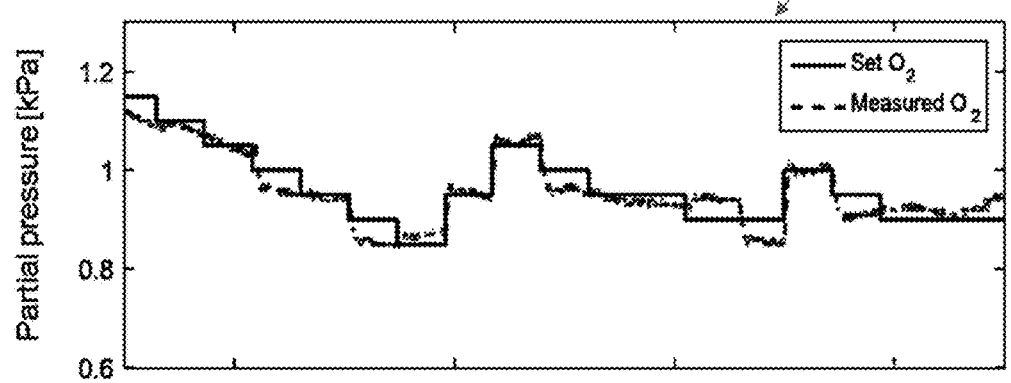
Figure 5C:
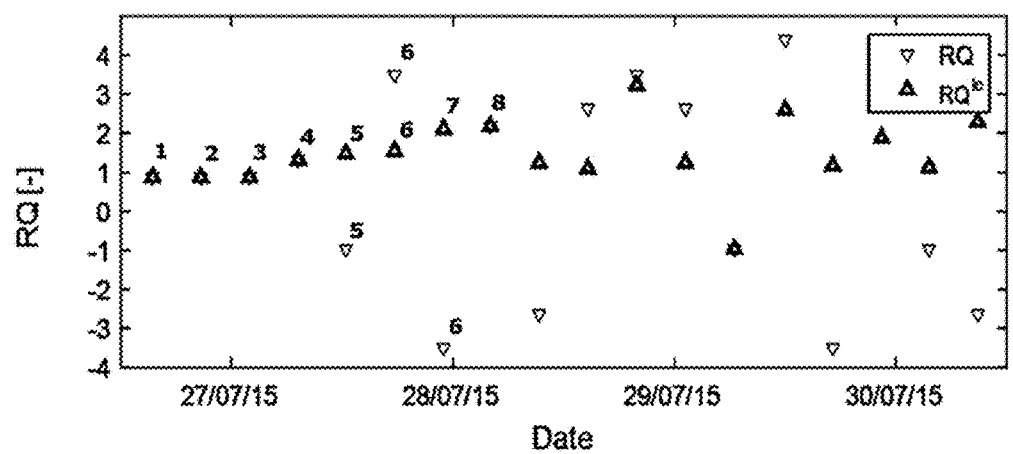
Figure 7:
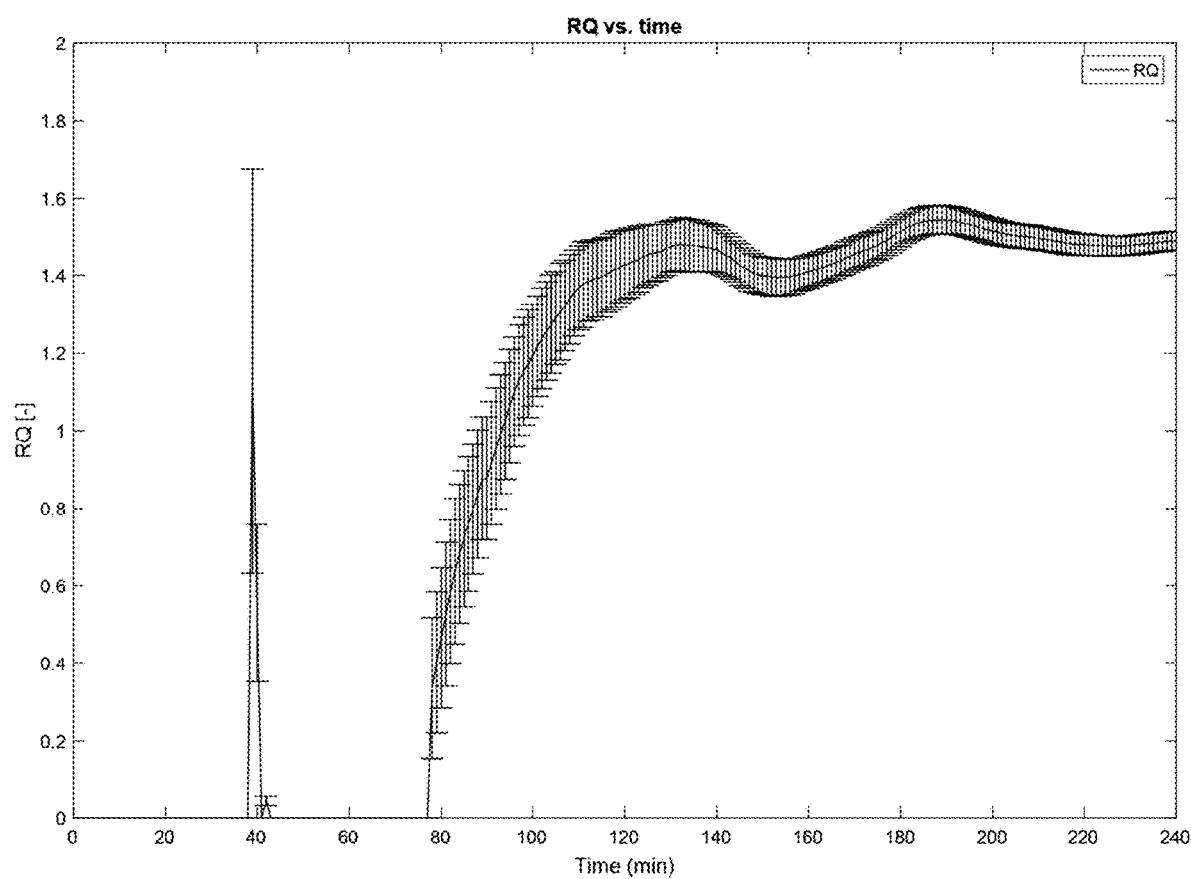
FIG. 7 illustrates the calculated standard errors of the real-time RQ estimates in a storage space containing respiratory produce. The standard error of the RQ estimate is calculated every minute for a time period of 240 minutes, based on the standard error of the estimates of the approximations of the time derivatives in equation 26.

What is claimed is:

1. A control system for controlling of respiratory produce in a confined environment, said control system comprising an operator/actuator, a gas analyser and an atmospheric pressure sensor, and a control unit adapted to receive signals of the gas analyser and of the atmospheric pressure sensor and adapted to generate an output signal responsive to a change of gas composition and pressure in the confined environment, which output signal drives the operator/actuator to adjust the gas composition in the confined environment, wherein the control unit is programmed:

1) to calculate a respiration coefficient as a function of a measured gas composition in the confined environment and as a function of the pressure in the confined environment, which respiration coefficient is determined by the control unit based on a mathematical model that at least uses the measured gas composition and pressure out of at least two consecutive times over a selective time period in the confined environment, wherein the mathematical model provides a rate of the change with time of a gas quantity ($n_i$) as a rate of exchange ($r_i$) with the respiratory produce of that gas, times mass (m) of respiratory produce, and a change of total quantity of gasses (n) minus a sum of rates of exchange of all gasses times a gas fraction $x_i^*$ obtained from the output of the atmospheric pressure sensor, where the respiration coefficient (RQ) is a defined mathematical function (f) of the rate of exchange ($r_i$) of the gas, and where the gas fraction ($x_i^*$) is taken as the gas fraction in the atmosphere when the atmospheric pressure is larger or the same as the pressure in the confined environment, or as the gas fraction in the confined environment when the atmospheric pressure is lower than in the confined environment, 2) as a function of the calculated respiration coefficient to determine an adjusted gas medium composition, and 3) to generate an output signal that drives the operator/actuator to control the respiratory produce.

2. The system according to claim 1, wherein the control unit is programmed to determine the adjusted gas medium composition based on a mathematical model of the system that at least uses measured gas composition and pressure at least two consecutive times over a selective time period in the confined environment to calculate in real time said respiration coefficient;

the adjusted gas medium composition being determined as a function of the calculated respiration coefficient in the confined environment, whereby the respiration coefficient is calculated in real time as the solution of the following system of equations:

$$\begin{cases} \frac{dn_i}{dt} = r_i m + \left(\frac{dn}{dt} - \sum_j (r_j) m\right) x_i^* \\ n_i = x_i \frac{PV}{RT}; \quad n = \sum_i n_i \\ x_i^* = x_i H + x_{i,a}(1 - H) \\ RQ = f(r_i) \\ i = 1, \ldots, m \end{cases}$$

with $$\frac{d}{dt}$$

the rate of change with time, $x_i$ the measured mole fraction of gas i in the confined environment, P the measured pressure in the confined environment, V the volume of the confined space, T the temperature in the confined environment, R the universal gas constant, m the mass of respiratory produce in the confined environment, $r_i$ is the rate of exchange of the gas with the metabolically active produce and $f(r_i)$ a defined mathematical function of $r_i$ values, the mole fraction $x_i^*$ is defined by the function H that states that H=0 when $\partial P/\partial t$ is larger than or equal to 0 and H=1 when $\partial P/\partial t$ is smaller than 0.

3. The system according to claim 1, wherein the control unit is programmed to determine the adjusted gas medium composition based on a mathematical model of the system that at least uses measured gas composition and pressure at least two consecutive times over a selective time period in the confined environment to calculate in real time said respiration coefficient;

the adjusted gas medium composition being determined as a function of the calculated respiration coefficient (RQ) in the confined environment, whereby the respiration coefficient (RQ) is the respiratory quotient of respiratory produce, and the gasses are $O_2$, $CO_2$ and $N_2$; the respiration coefficient (RQ) is calculated in real time as the solution of the following system of equations:

$$\begin{cases} \dfrac{dn_{O_2}}{dt} = -r_{O_2}m + \left(\dfrac{dn}{dt} - (r_{CO_2} - r_{O_2})m\right)x^*_{O_2} \\ \dfrac{dn_{CO_2}}{dt} = r_{CO_2}m + \left(\dfrac{dn}{dt} - (r_{CO_2} - r_{O_2})m\right)x^*_{CO_2} \\ \dfrac{dn_{N_2}}{dt} = \left(\dfrac{dn}{dt} - (r_{CO_2} - r_{O_2})m\right)x^*_{N_2} \\ n_i = x_i\dfrac{PV}{RT}; \quad n = \sum_i n_i \\ x_i^* = x_iH + x_{i,a}(1-H) \\ RQ = \dfrac{r_{CO_2}}{r_{O_2}} \end{cases}$$

with $$\dfrac{d}{dt}$$

the rate of change with time, $x_i$ the measured mole fraction of gas i in the confined environment, P the measured pressure in the confined environment, V the volume of the confined space, T the temperature in the confined environment, R the universal gas constant, m the mass of respiratory produce in the confined environment, $r_{O_2}$ is the oxygen consumption rate of the respiratory produce and $r_{CO_2}$ is the carbon dioxide production rate of the respiratory produce, the mole fraction $x_i^*$ is defined by the function H that states that H=0 when $\partial P/\partial t$ is larger than or equal to 0 and H=1 when $\partial P/\partial t$ is smaller than 0.

4. The system according to claim 1 whereby the system comprises at least one gas analyser and at least one atmospheric pressure sensor connected to a control unit arranged to determine an adjusted gas medium composition of the confined storage environment for protecting the produce against fermentative degradation;

and at least one operator/actuator arranged to adapt the gas medium in the confined storage environment based on said determined adjusted gas medium composition;

wherein the control unit is programmed to determine the adjusted gas medium composition based on a mathematical model of the system that uses at least measured gas composition and pressure at two consecutive times over a selective time period in the defined confined storage environment to calculate in real time said respiration coefficient that is a function of the oxygen consumption rate and carbon dioxide production rate of the produce that characterize respiration and fermentation;

the adjusted gas medium composition being determined as a function of the calculated respiration coefficient in the confined storage environment, whereby respiration coefficient is calculated in real time as the solution of the following system of equations:

$$\begin{cases} \dfrac{dn_{O_2}}{dt} = -r_{O_2}m + \left(\dfrac{dn}{dt} - (r_{CO_2} - r_{O_2})m\right)x^*_{O_2} \\ \dfrac{dn_{CO_2}}{dt} = r_{CO_2}m + \left(\dfrac{dn}{dt} - (r_{CO_2} - r_{O_2})m\right)x^*_{CO_2} \\ \dfrac{dn_{N_2}}{dt} = \left(\dfrac{dn}{dt} - (r_{CO_2} - r_{O_2})m\right)x^*_{N_2} \\ n_i = x_i\dfrac{PV}{RT}; \quad n = \sum_i n_i \\ x_i^* = x_iH + x_{i,a}(1-H) \\ RQ = \dfrac{r_{CO_2}}{r_{O_2}} \end{cases}$$

with $$\dfrac{d}{dt}$$

the rate of change with time, $x_i$ the measured mole fraction of gas i in the confined environment, P the measured pressure in the confined environment, V the volume of the confined space, T the temperature in the confined environment, R the universal gas constant, m the mass of respiratory produce in the confined environment, $r_{O_2}$ is the oxygen consumption rate of the respiratory produce and $r_{CO_2}$ is the carbon dioxide production rate of the respiratory produce, the mole fraction $x_i^*$ is defined by the function H that states that H=0 when $\partial P/\partial t$ is larger than or equal to 0 and H=1 when $\partial P/\partial t$ is smaller than 0.

5. The control system according to claim 1, whereby the gas analyser is indicative of a level or composition of the atmosphere in the confined environment or whereby the atmospheric pressure sensor is indicative of an atmosphere pressure in the confined environment, or whereby the control unit is configured to continuously receive the signals of the gas analyser and of the atmospheric pressure sensor.

6. The control system according to claim 1, whereby the respiration coefficient is calculated in real time or whereby the respiration coefficient, function of the oxygen consumption rate and carbon dioxide production rate of the produce, characterises respiration and fermentation of the produce.

7. The control system according to claim 1, whereby the control unit is designed to generate an output signal to control the metabolic activity of the produce.

8. The control system according to claim 1, whereby the control unit is designed to generate an output signal to protect the produce against metabolic disturbance, or whereby the control unit is designed to generate an output signal to protect the produce against degradation or whereby the control unit is designed to generate an output signal to protect the produce against fermentative degradation.

9. The system according to claim 1, further comprising a temperature sensor and a control unit adapted to receive the signals of the temperature sensor and adapted to generate an output signal responsive to the temperature or further comprising a volumetric sensor and a control unit adapted to receive the signals of the volumetric sensor and adapted to generate an output signal responsive to volume.

10. The system according to claim 1, further comprising a temperature sensor and whereby the control unit is furthermore adapted to continuously receive the signals of the temperature sensor and adapted to generate an output signal responsive to the temperature or
- further comprising a volumetric sensor and whereby the control unit is furthermore adapted to continuously receive the signals of the volumetric sensor and adapted to generate an output signal responsive to volume or
- whereby the atmospheric pressure sensor is a barometric pressure sensor or whereby the system controls gas composition with respect to at least one of the following gasses oxygen, carbon dioxide, nitrogen, ethanol, acetaldehyde, ethylene, ethane, acetone.

11. The system according to claim 1, where the function for the respiration coefficient is a linear or a nonlinear function of metabolic exchange rates of different relevant gasses with the produce or wherein the pressure and gas composition in the defined confined storage environment are measured continuously for a certain period of time or
- wherein the pressure and gas composition in the defined confined storage environment are measured periodically with a fixed or adaptive time interval for a certain period of time.

12. The system according to claim 1, wherein the total measurement time and time intervals between subsequent measurements of gas composition and pressure are optimized such that the measured gas composition and pressure signals contain the maximal amount of information of the metabolic rates of respiration and fermentation and the least possible measurement noise or
- wherein the measured gas composition and pressure signals are subjected to signal processing to filter out measured noise.

13. The system according to claim 1, wherein besides the metabolic rates of respiration and fermentation, also the error of the estimated metabolic rates and respiration coefficient are calculated, or
- wherein the calculated metabolic rates and/or respiration coefficient are subjected to evaluation based on validity criteria based on the calculated errors of the metabolic rates, respiration coefficient and pressure.

14. The system according to claim 1, wherein gas flows of oxygen gas, carbon dioxide gas and nitrogen gas, both from the environment of the confined space to the confined space itself as well as from the confined space to its environment due to leakage are taken into account to calculate the respiration coefficient or wherein carbon dioxide gas flow due to leakage from the environment to the confined space may neglected by the control algorithm when calculating the respiration coefficient.

15. The system according to claim 1, wherein control system is adapted to calculate the adjusted gas composition as a function of the determined metabolic rates or coefficient or
- wherein the control unit is adapted for comparing the calculated respiration coefficient to the set point value of the respiration coefficient, its integral or its differential and wherein the control unit is adapted for comparing the $CO_2$ level to the maximum tolerable concentration of the produce.

16. The system according to claim 1, wherein the control unit is also adapted for comparing the calculated respiration coefficient to the set point value of the respiration coefficient, its integral or its differential and wherein the control unit is adapted for comparing the $O_2$ level to the minimal tolerable concentration of the produce, or
- wherein the control unit is also adapted for comparing the calculated respiration coefficient to the threshold value of the respiration coefficient and wherein the control unit is adapted for comparing the $O_2$ level to the minimal tolerable concentration of the produce, wherein the determined metabolic rates or respiration coefficient is used to calculate the adjusted gas composition,
- whereby the gas composition in the confined storage space are maintained a fixed composition.

17. The system according to claim 1, wherein the control unit comprises a PID controller for automatically calculating the future gas medium composition required to maintain the respiration coefficient at safe levels or
- wherein the control unit comprises a PID controller for automatically calculating the future gas medium composition required to maintain the respiration coefficient at a certain set point value, or
- wherein the control unit comprises a model predictive control for automatically calculating the future gas medium composition required to maintain the respiration coefficient at safe levels.

18. The system according to claim 1, whereby said operator/actuator for adapting the gas composition in the confined storage environment comprises a means for flowing at least one gas into said confined storage environment and a means for scrubbing at least one gas or
- wherein the confined space subject to control, has a constant volume or wherein the confined space subject to control, has a constant temperature or
- wherein the confined space are a reservoir inside another confined space.

19. The system according to claim 1 wherein the control system does not seal off the confined storage environment or part of the confined storage environment from gas flow in to or out of the confined storage environment from or to the external environment or
- wherein the control system does not estimate model parameters with uncertainty that may lead to introduction of errors in the estimates of the metabolic rates of respiration and fermentation and the respiration coefficient or
- wherein the control system does not estimate a leakage coefficient, equivalent leak hole diameter, pressure difference or pressure drop dynamics curve.

20. The system according to claim 1, whereby only the internal pressure is used for leakage flow calculation without a leakage parameter (k) estimation, or
- whereby due to the leakage disturbance correction mathematical model based on pressure driven leakage no equivalent leak hole diameter needs to be calculated or
- whereby dynamic control of relative gas composition in the confined environment is targeted instead of fixed relative gas composition.

* * * * *